(12) United States Patent
Skinner et al.

(10) Patent No.: US 12,038,319 B2
(45) Date of Patent: Jul. 16, 2024

(54) SCALE CALIBRATION DEVICE AND METHOD OF USE

(71) Applicant: Pelstar, LLC, McCook, IL (US)

(72) Inventors: Brian C. Skinner, McCook, IL (US); Ken Harris, McCook, IL (US)

(73) Assignee: Pelstar, LLC, McCook, IL (US)

( * ) Notice: Subject to any disclaimer, the term of this patent is extended or adjusted under 35 U.S.C. 154(b) by 46 days.

(21) Appl. No.: 17/668,251

(22) Filed: Feb. 9, 2022

(65) Prior Publication Data

US 2022/0341771 A1 Oct. 27, 2022

Related U.S. Application Data

(63) Continuation-in-part of application No. 17/061,809, filed on Oct. 2, 2020, now abandoned, which is a continuation-in-part of application No. 16/145,276, filed on Sep. 28, 2018, now abandoned.

(60) Provisional application No. 63/147,890, filed on Feb. 10, 2021, provisional application No. 62/564,861, filed on Sep. 28, 2017.

(51) Int. Cl.
*G01G 23/01* (2006.01)
*G01G 19/44* (2006.01)

(52) U.S. Cl.
CPC ........... *G01G 23/012* (2013.01); *G01G 19/44* (2013.01)

(58) Field of Classification Search
CPC ...... G01G 23/012; G01G 19/44; G01G 21/26; G01G 23/01
USPC .......................................................... 177/1
See application file for complete search history.

(56) References Cited

U.S. PATENT DOCUMENTS

| | | |
|---|---|---|
| 1,746,351 A | 2/1930 | Hem |
| 2,321,652 A | 6/1943 | Carliss |
| 2,786,378 A | 3/1957 | Ethington et al. |
| 3,194,050 A | 7/1965 | Ruge |
| 3,738,439 A | 6/1973 | Herbert |
| 3,924,443 A | 12/1975 | Hebert |
| 4,090,393 A | 5/1978 | Kharitonov et al. |
| 4,220,037 A | 9/1980 | Widehn |
| 4,249,633 A | 2/1981 | Dunbar |
| 4,347,904 A | 9/1982 | Dunbar |
| 4,353,427 A | 10/1982 | Stock et al. |
| 4,406,338 A * | 9/1983 | Dunbar .................. G01G 23/01 73/1.13 |
| 4,637,481 A * | 1/1987 | Shoemaker ............ G01G 19/08 73/1.13 |

(Continued)

FOREIGN PATENT DOCUMENTS

| | | |
|---|---|---|
| AU | 2011200160 A1 | 8/2011 |
| BR | 132012032845 E2 * | 8/2014 |

(Continued)

*Primary Examiner* — Marrit Eyassu
(74) *Attorney, Agent, or Firm* — Michael Best & Friedrich LLP

(57) ABSTRACT

A scale calibration device and method of use. The device may include a base supportable on and movable along a surface to a location. The base further includes a base surface for supporting a scale to be calibrated proximate the location. The device includes a frame assembly connected to the base and operable to support, in a position over the base surface, means for simulating a dead weight, the means being operable to apply a force to the scale supported on the base surface.

15 Claims, 30 Drawing Sheets

(56) References Cited

U.S. PATENT DOCUMENTS

| | | | |
|---|---|---|---|
| 4,658,921 A * | 4/1987 | Karpa | G01G 23/01 |
| | | | 73/1.13 |
| 4,722,407 A | 2/1988 | Gindy et al. | |
| 4,798,094 A | 1/1989 | Newhall et al. | |
| 4,848,478 A | 7/1989 | Hafner | |
| 4,909,338 A | 3/1990 | Vitunic et al. | |
| 5,257,668 A | 11/1993 | Sargent et al. | |
| 5,533,380 A | 7/1996 | Ferris | |
| 5,877,456 A | 3/1999 | Homer, III et al. | |
| 5,900,591 A | 5/1999 | Liu | |
| 6,278,067 B1 | 8/2001 | Allen et al. | |
| 6,414,251 B1 | 7/2002 | Edwards et al. | |
| 6,539,771 B1 | 4/2003 | Davidson et al. | |
| 6,629,446 B2 | 10/2003 | Parker | |
| 6,792,371 B1 | 9/2004 | Turner | |
| 6,861,593 B2 | 3/2005 | Kuhlmann et al. | |
| 7,681,432 B2 | 3/2010 | Hay et al. | |
| 7,788,964 B2 | 9/2010 | Thillen et al. | |
| 7,975,526 B2 | 7/2011 | Genoud et al. | |
| 8,001,846 B2 | 8/2011 | Berra | |
| 8,459,092 B2 | 6/2013 | Inglin | |
| 8,839,655 B2 | 9/2014 | Bormann et al. | |
| 9,097,574 B2 | 8/2015 | Yao et al. | |
| 9,116,033 B2 | 8/2015 | Lin et al. | |
| 9,696,229 B2 | 7/2017 | Schulz et al. | |
| 2008/0164074 A1 * | 7/2008 | Wurz | G01G 11/00 |
| | | | 177/1 |
| 2008/0223625 A1 * | 9/2008 | Lawler | G01G 19/44 |
| | | | 177/25.13 |
| 2009/0107207 A1 * | 4/2009 | Yamazaki | G01G 19/44 |
| | | | 73/1.13 |
| 2013/0098136 A1 * | 4/2013 | Yao | G01G 23/01 |
| | | | 73/1.13 |
| 2015/0039249 A1 | 2/2015 | Heinrich et al. | |
| 2015/0096348 A1 | 4/2015 | Schultz et al. | |
| 2016/0011038 A1 | 1/2016 | Schrag et al. | |
| 2017/0082483 A1 | 3/2017 | Vogel | |

FOREIGN PATENT DOCUMENTS

| | | | | |
|---|---|---|---|---|
| CN | 102538937 B | * | 11/2013 | |
| CN | 102538937 B | | 11/2013 | |
| DE | 102007036214 A1 | * | 6/2008 | G01G 23/01 |
| DE | 102007036214 A1 | | 6/2008 | |
| DE | 102013105647 A1 | | 12/2014 | |
| GB | 2517918 A | * | 3/2015 | G01G 19/4144 |
| JP | 2008267935 A | | 11/2008 | |

* cited by examiner

Front View of the force application assembly

Calibration Device – Major Components

Calibration Device with scale shown in test position

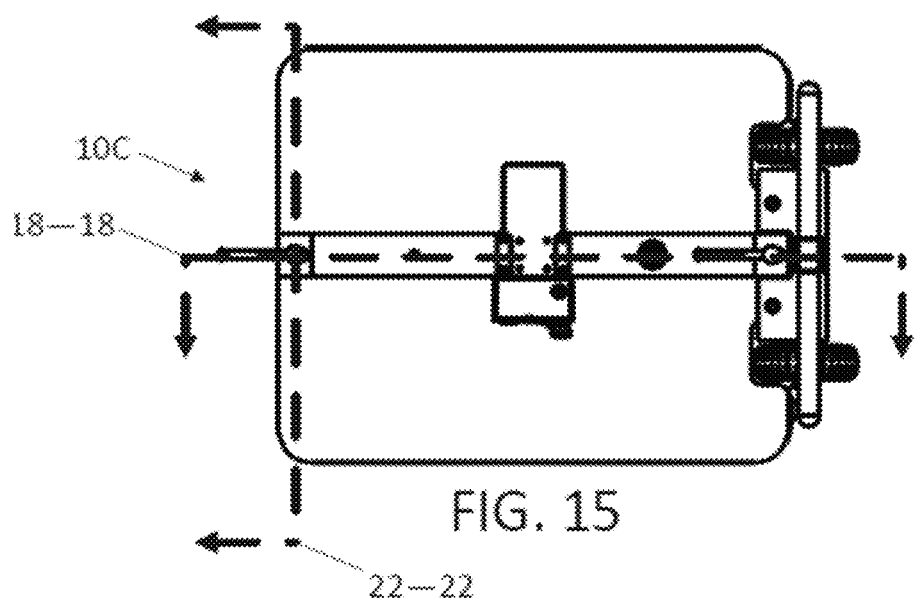
FIG. 15
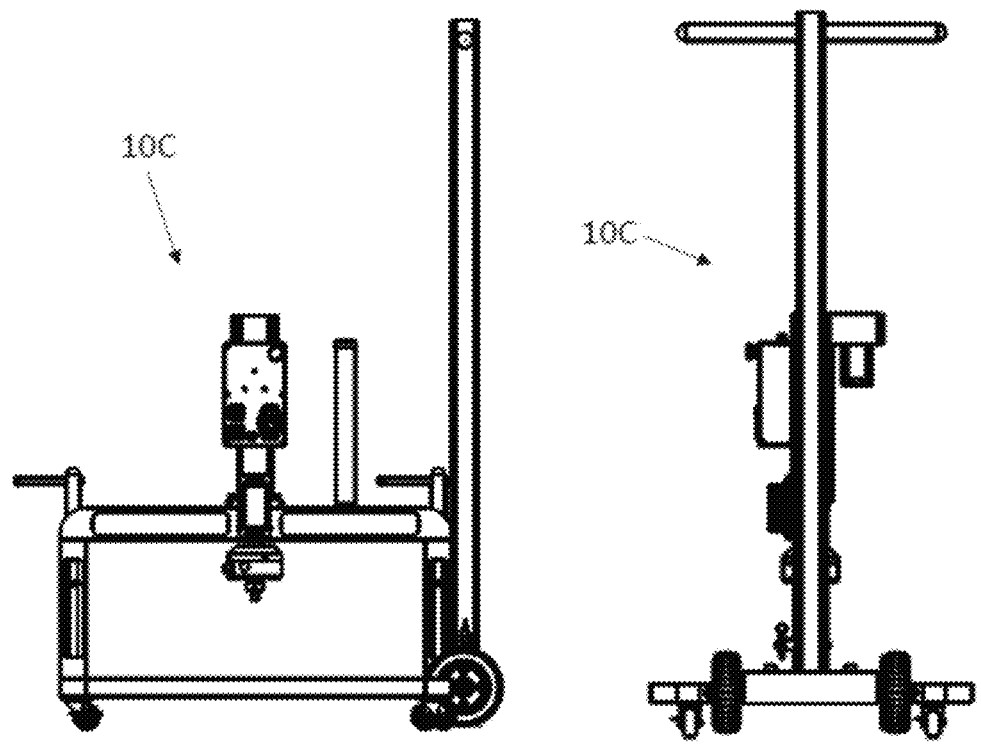
FIG. 16
FIG. 17

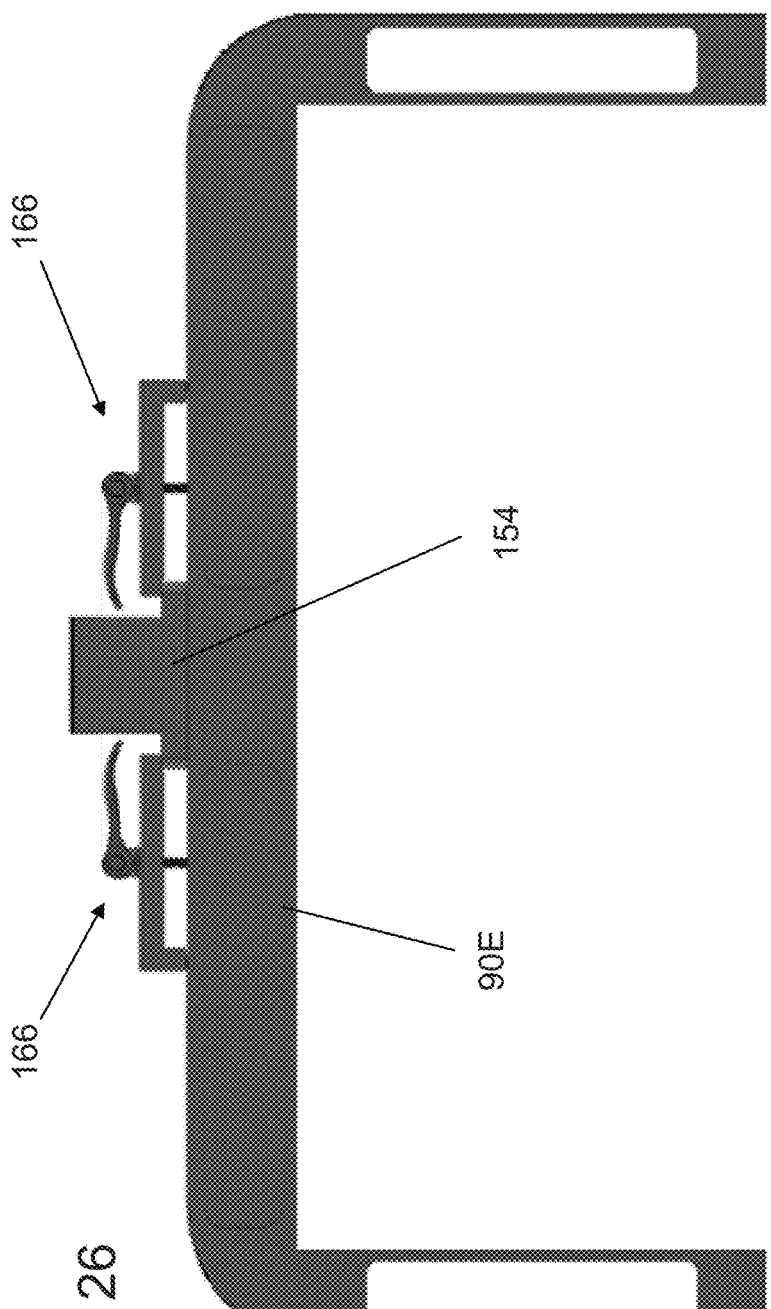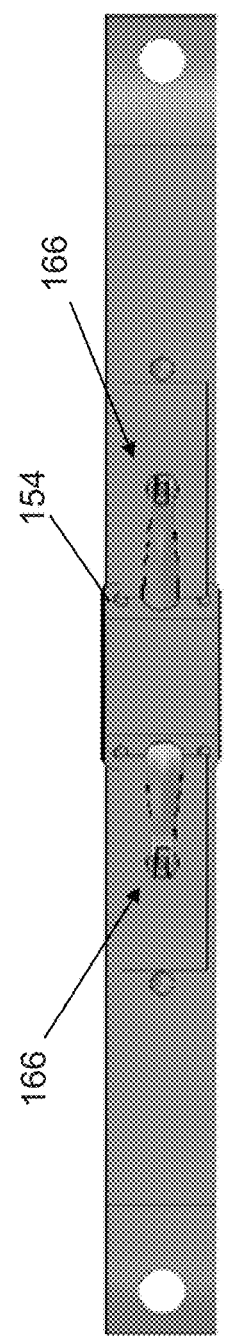

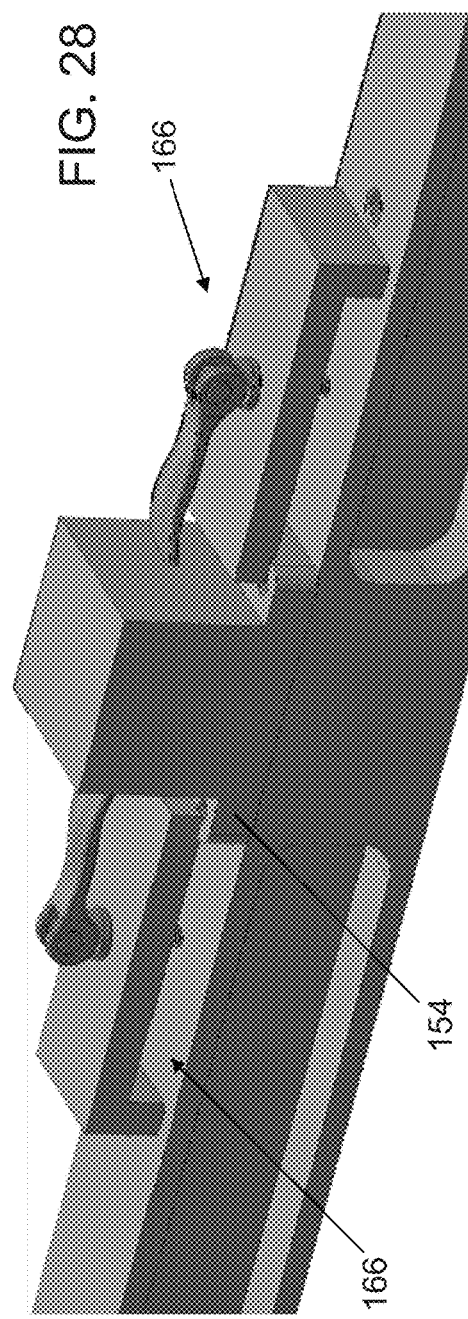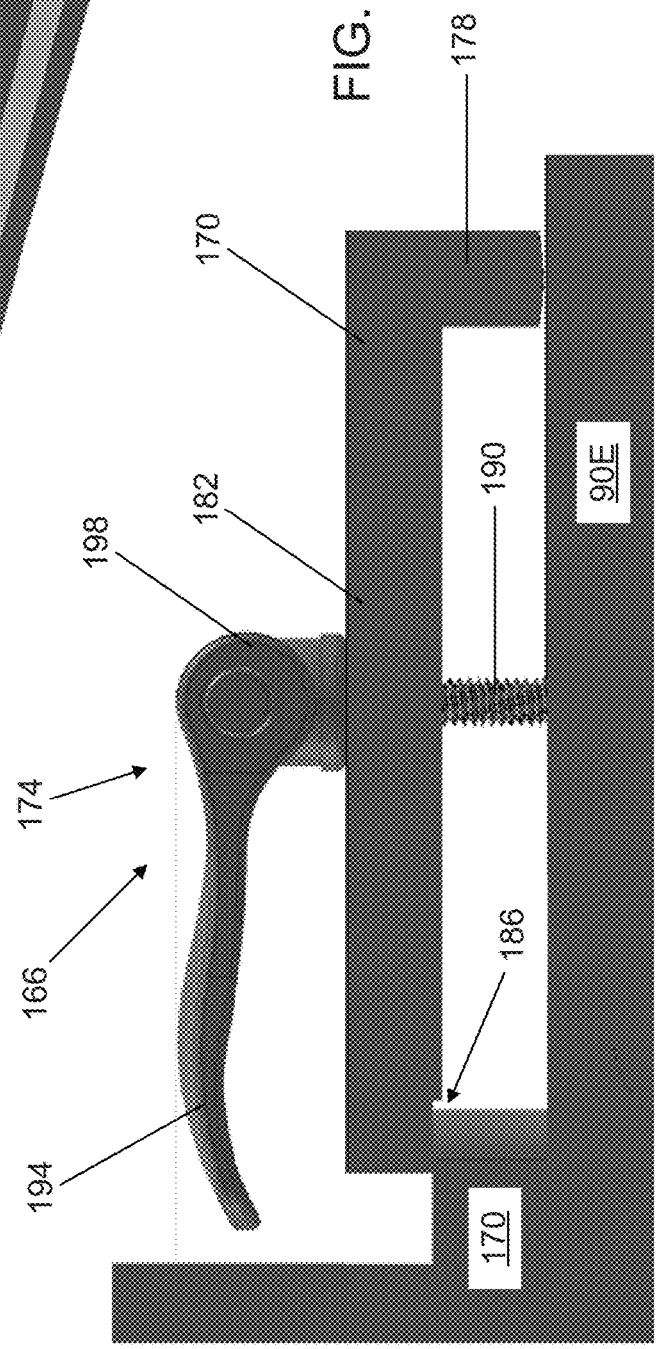

SCALE CALIBRATION DEVICE AND METHOD OF USE

RELATED APPLICATIONS

The present application is claims priority to U.S. Patent Application No. 63/147,890, filed Feb. 10, 2021, and is a continuation-in-part of co-pending U.S. patent application Ser. No. 17/061,809, filed Oct. 2, 2020, which is a continuation-in-part of U.S. patent application Ser. No. 16/145,276, filed Sep. 28, 2018, now abandoned, which claims priority to U.S. Provisional Patent Application No. 62/564,861, filed Sep. 28, 2017, the entire contents of all of which are hereby incorporated by reference.

FIELD

The present invention relates to calibration devices and methods of calibrating devices, such as scales and, more particularly, medical scales.

SUMMARY

Scales to weigh people come in a variety of sizes. Typically, those used in the medical industry are larger and more robust than those for home use. It is important for scales, especially medical scales, to be accurately calibrated.

Current devices and methods for calibrating such scales are heavy and cumbersome, typically requiring standard weights weighing hundreds of pounds. Storage, movement and use of these calibration devices can be difficult and labor- and time-intensive.

In some independent embodiments, the present invention may provide a portable, force application device for the calibration, accuracy testing, etc., of a scale, such as a professional medical scale. The device may eliminate or minimize the need to transport and manipulate large certified test weights to accomplish such tasks. In some embodiments, the device may employ test software operating on a computing device, such as a tablet, laptop, personal computer, desktop, terminal, etc., to monitor an applied force, to log data, and/or to output such data (e.g., provide reports).

The device may be used to calibrate medical scales in lieu of certified test weights. For example, the National Institute of Standards and Technology (NIST) recommends that a 1000-pound (lb.) capacity scale be calibrated at a minimum weight of 300 pounds (lbs.). The device may improve calibration, accuracy testing, etc. of scales, compared to manipulating test weights. The device may be capable of single load point calibration as well as multiple load point calibration.

The device may also be capable of checking the accuracy of medical scales across their entire rated load range. For example, the force applied by the device can be compared to an indicated weight on the scale S to develop a scale performance curve. A review of this data can provide useful information on accuracy of the scale and/or help diagnose the nature of any inaccuracies of the scale.

The device may make scale testing practical, as the device can eliminate the prohibitive amount of effort and/or transportation of up to 1000 lbs. or more of certified test weights. These constraints have typically resulted in an industry practice that is tolerant of not reviewing scale performance across the entire operating load range of the scale.

In one independent aspect, a device may generally include a base supportable on and movable along a surface to a location, the base including a base surface for supporting a scale to be calibrated proximate the location; and a frame assembly connected to the base and operable to support, in a position over the base surface, means for simulating a dead weight, the means being operable to apply a force to the scale supported on the base surface.

In another independent aspect, a method of calibrating a scale may be provided. The method may generally include moving to a location a calibration device, the calibration device including a base with a base surface and a frame assembly connected to the base; supporting a scale to be calibrated proximate the location on the base surface; and, with a device supported on the frame assembly over the base surface, applying a force simulating a dead weight to the scale supported on the base surface to calibrate the scale.

In yet another independent aspect, a device may generally include a base supportable on and movable along a surface to a location, the base including a base surface for supporting a scale to be calibrated proximate the location; a frame assembly connected to the base; and means for simulating a dead weight supported on the frame assembly in a position over the base surface, the means for simulating a dead weight being operable to apply a force to the scale supported on the base surface to calibrate the scale.

In a further independent aspect, a scale calibration device may generally include a base supportable on and movable along a surface to a location, the base including a base surface for supporting a scale to be calibrated proximate the location; and a frame assembly connected to the base and operable to support a force-applying mechanism in a position over the base surface, the force-applying, mechanism being operable to apply a force to the scale supported on the base surface.

In another independent aspect, a method of calibrating a scale may be provided. The method may generally include moving to a location a calibration device, the calibration device including a base with a base surface and a frame assembly connected to the base; supporting a scale to be calibrated proximate the location on the base surface; and applying a force to the scale supported on the base surface to calibrate the scale, applying including applying a force with a force-applying mechanism supported on the frame over the base surface.

In yet another independent aspect, a calibration device may generally include a base supportable on and movable along a surface to a location, the base including a base surface for supporting a scale to be calibrated proximate the location; a frame assembly connected to the base, the frame assembly having an end; and a force-applying mechanism supported on the end of the frame assembly in a position over the base surface, the force applying mechanism being operable to apply a force to the scale supported on the base surface to calibrate the scale.

In another independent aspect, a scale calibration device may generally include a base supportable on and movable along a surface to a location, the base including a base surface for supporting a scale to be calibrated proximate the location; a frame assembly connected to the base; a support assembly operable to support a computing device for use in calibration of the scale, the support assembly being connected to the base separately from the frame assembly; and means for simulating a dead weight supported on the frame assembly in a position over the base surface, the means for simulating a dead weight being operable to apply a force to the scale supported on the base surface to calibrate the scale.

BRIEF DESCRIPTION OF THE DRAWINGS

FIG. 15 is a top view of the device of FIG. 12.
FIG. 16 is a side view of the device of FIG. 12.
FIG. 17 is a rear view of the device of FIG. 12.
FIG. 26 is a front view of the bridge assembly of FIG. 24.
FIG. 27 is a top view of the bridge assembly of FIG. 24.
FIG. 28 is an enlarged perspective view of a portion of the bridge assembly of FIG. 24.
FIG. 29 is an enlarged front view of a portion of the bridge assembly.

DETAILED DESCRIPTION

Figure 1:
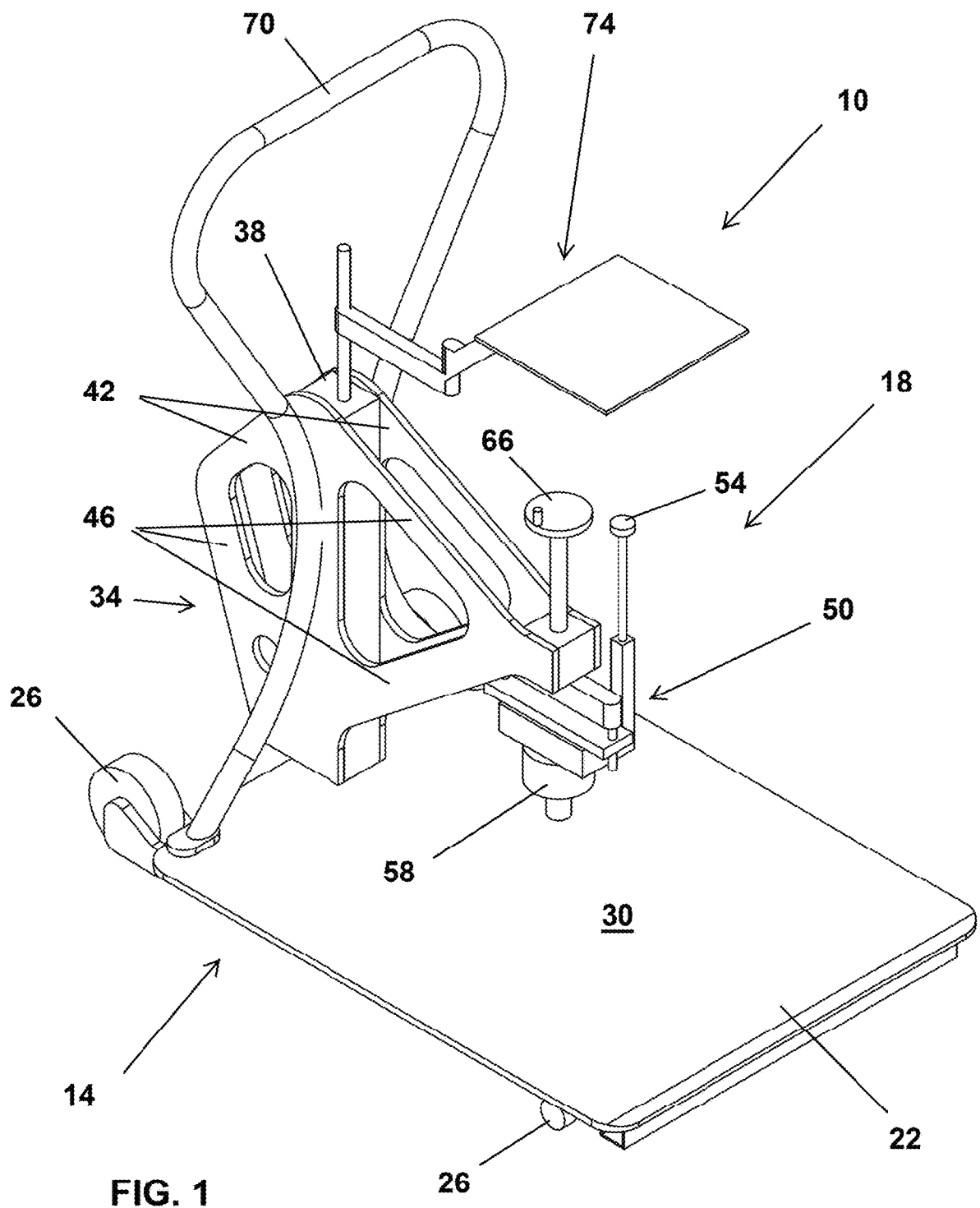
FIG. 1 is a perspective view of a scale calibration device.
Figure 2:
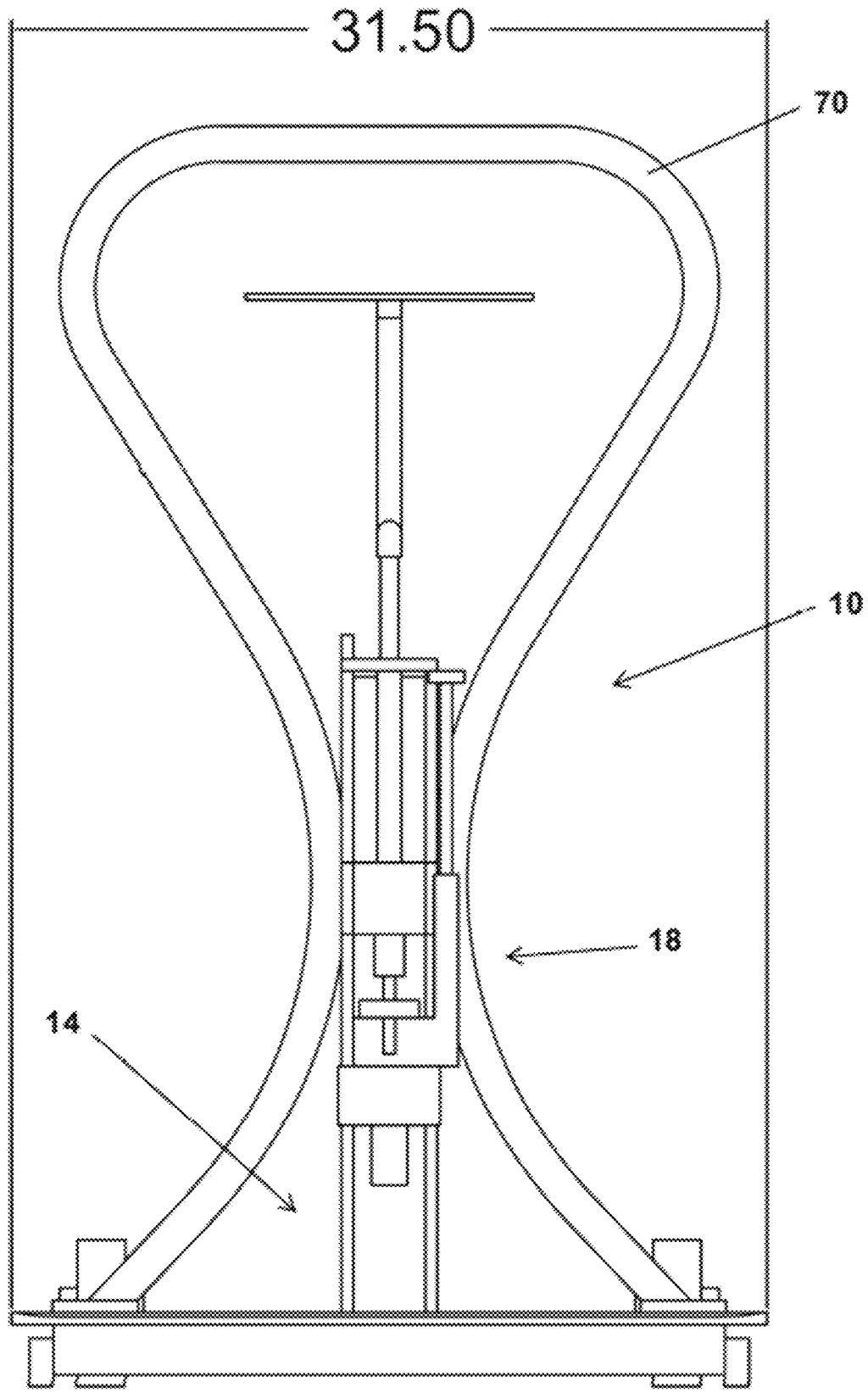
FIG. 2 is a front view of the device of FIG. 1.
Figure 3:
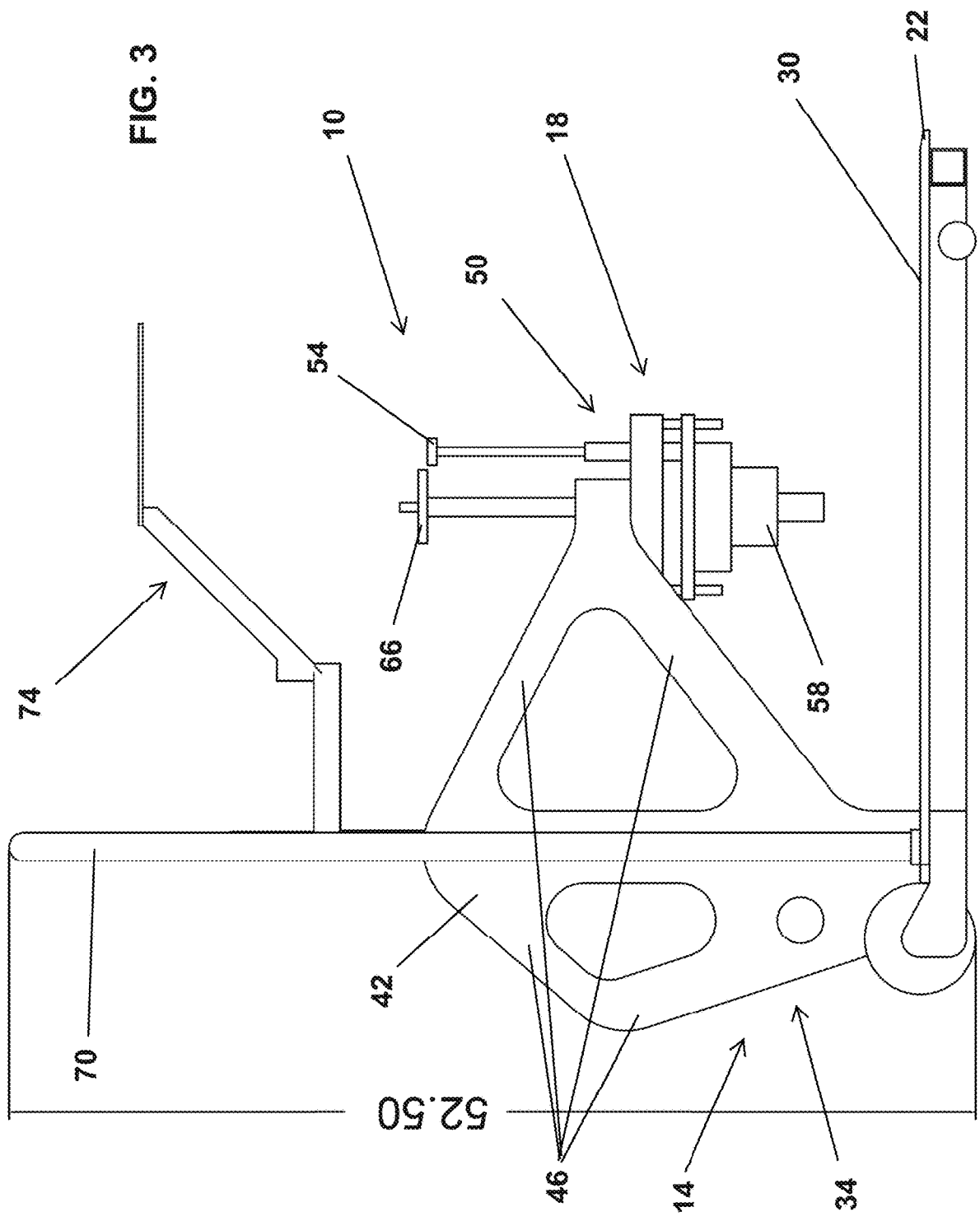
FIG. 3 is a side view of the device of FIG. 1.
Figure 4:
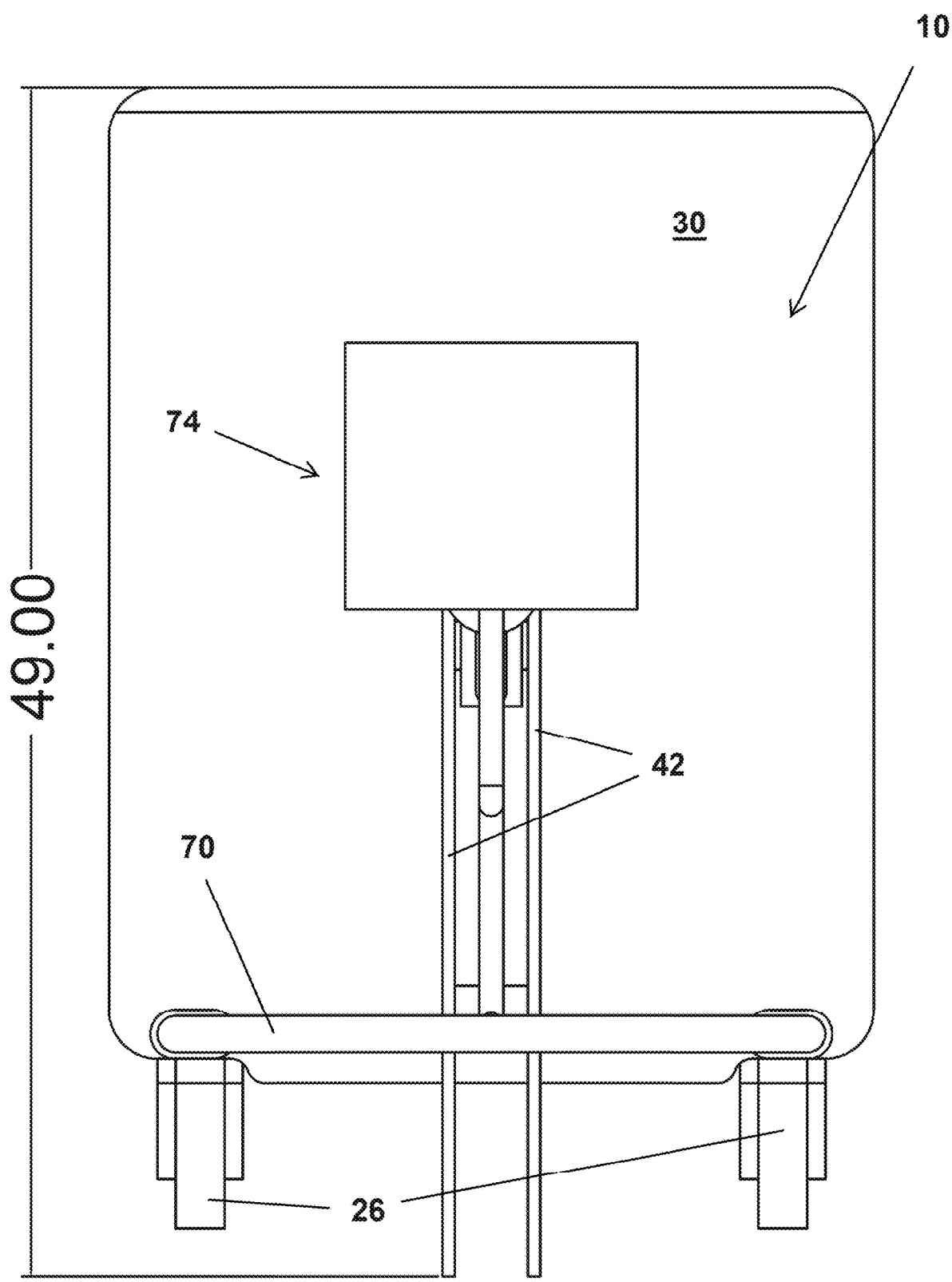
FIG. 4 is a top view of the device of FIG. 1.
Figure 5:
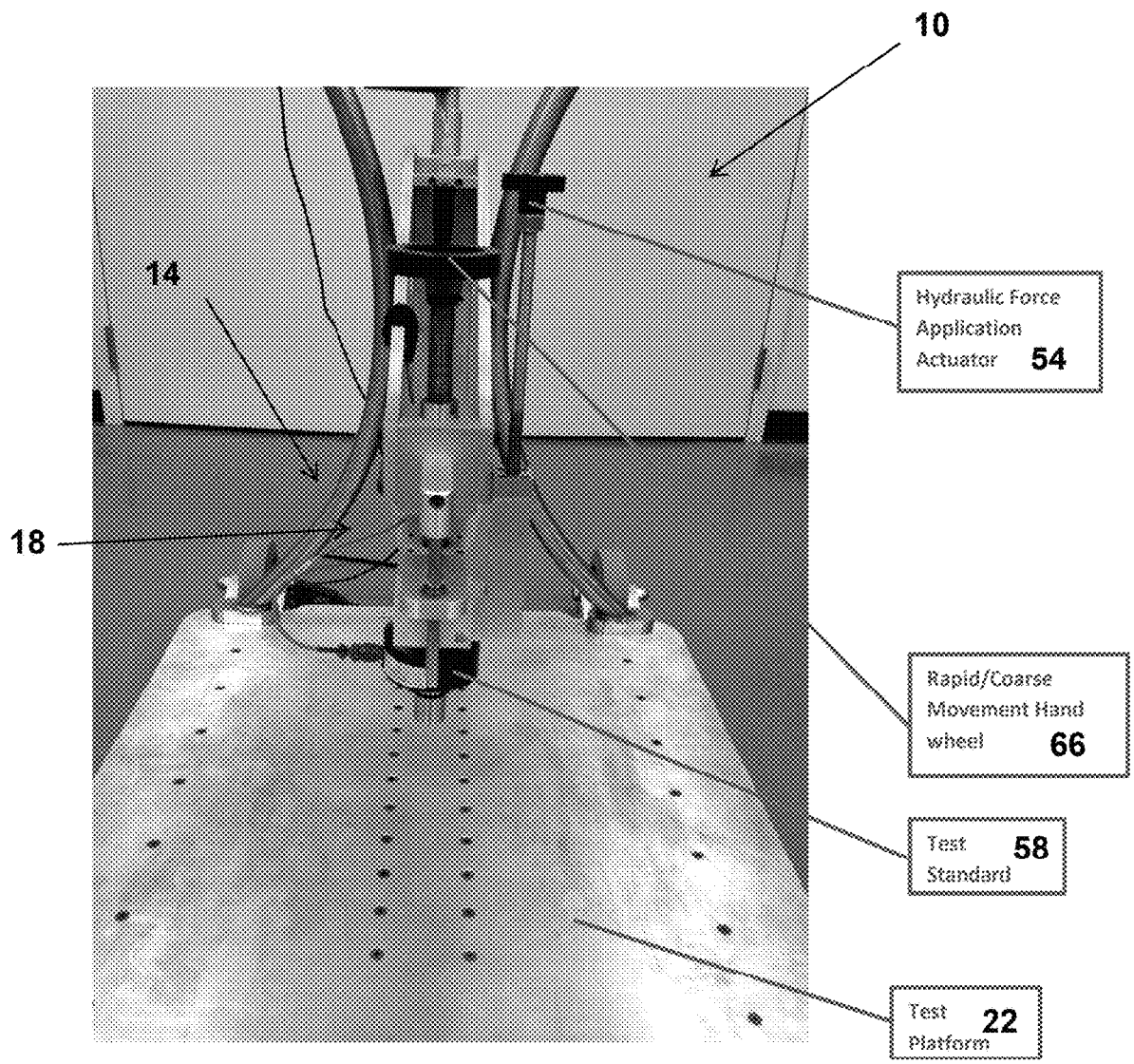
FIG. 5 is a photo of a front perspective view a scale calibration device.
Figure 6:
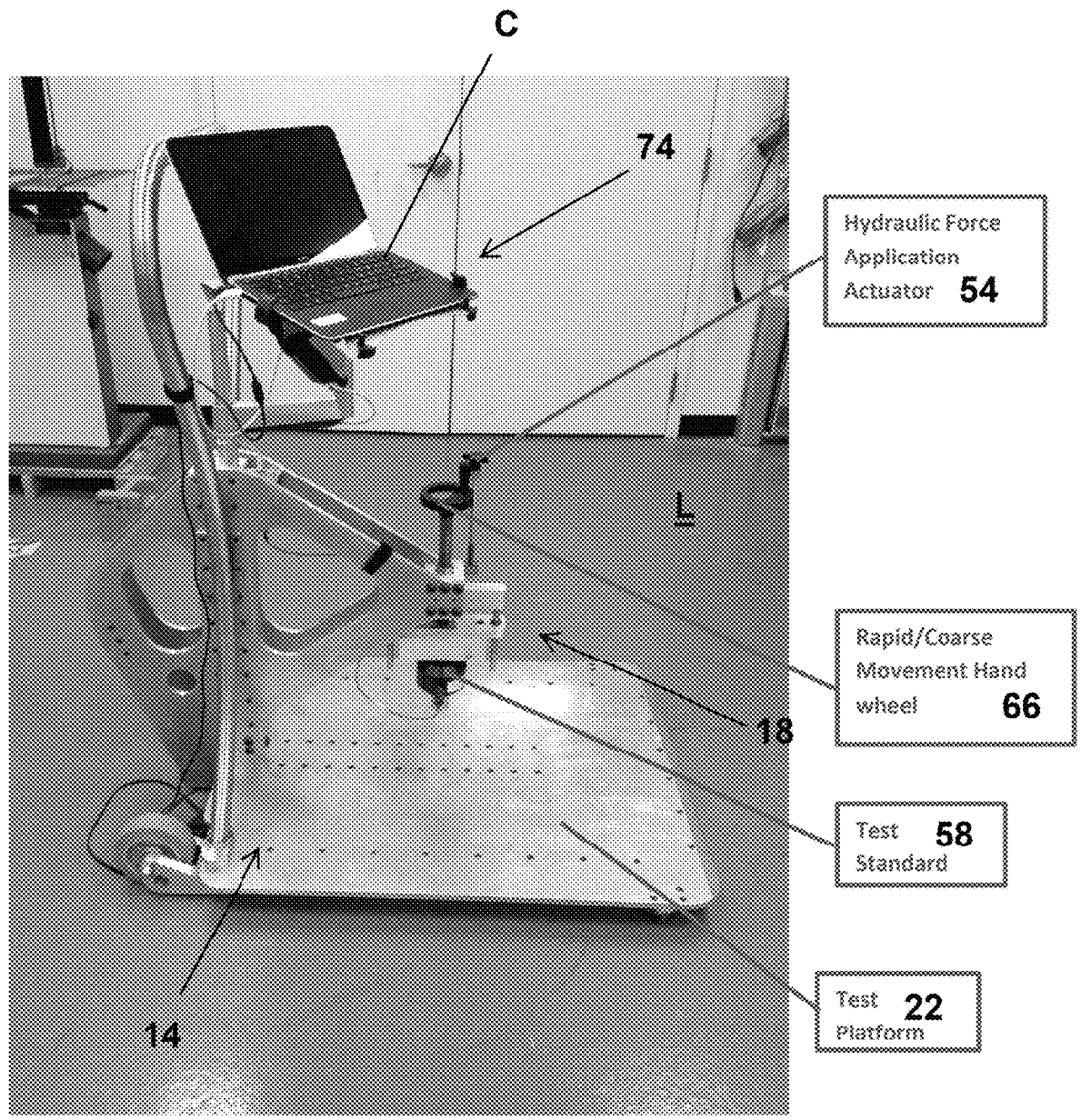
FIG. 6 is a photo of a perspective side view of the device of FIG. 5.
Figure 7:
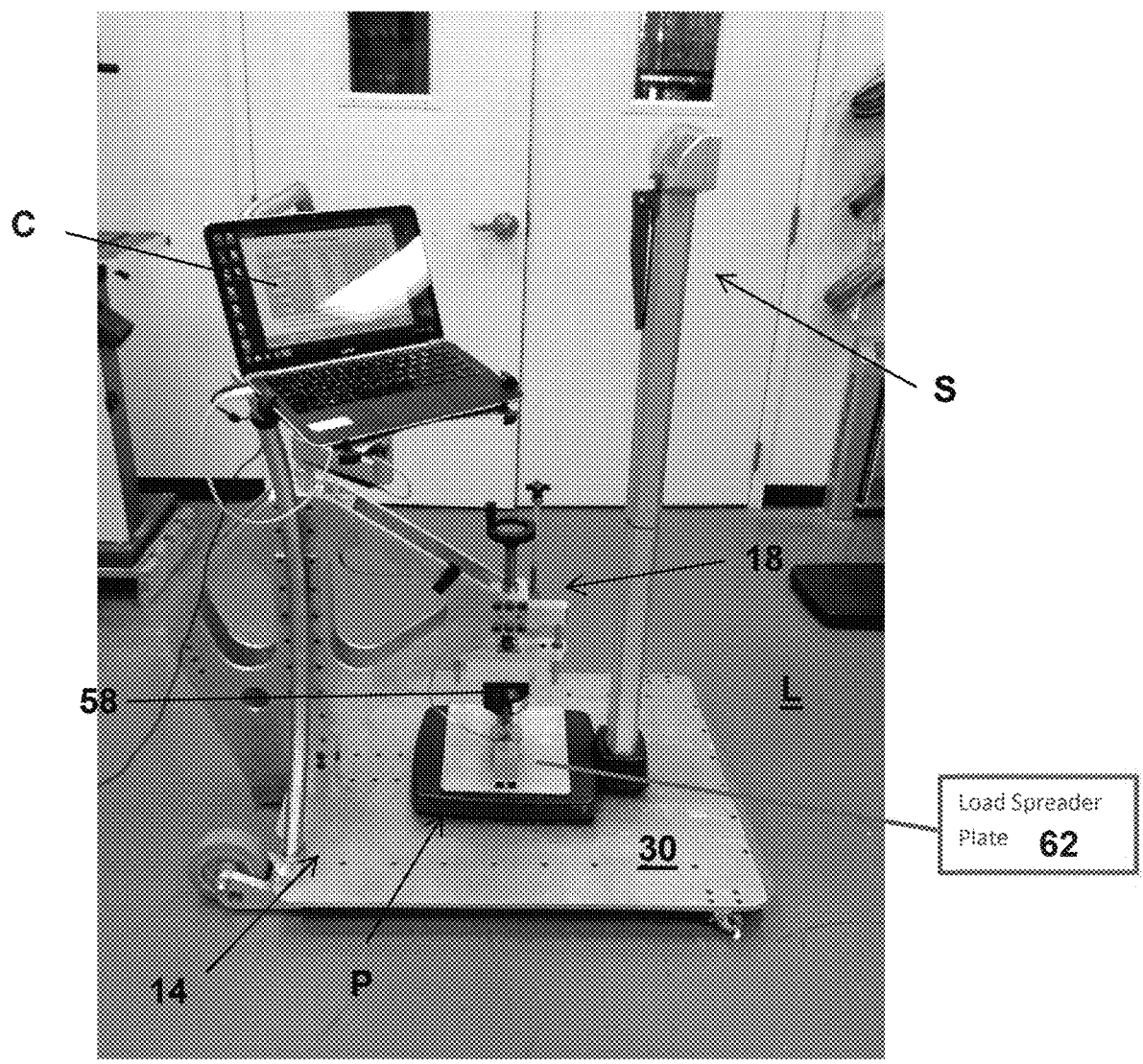
FIG. 7 is a photo of a perspective side view of the device of FIG. 5, illustrated supporting a scale to be calibrated.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Figure 8:
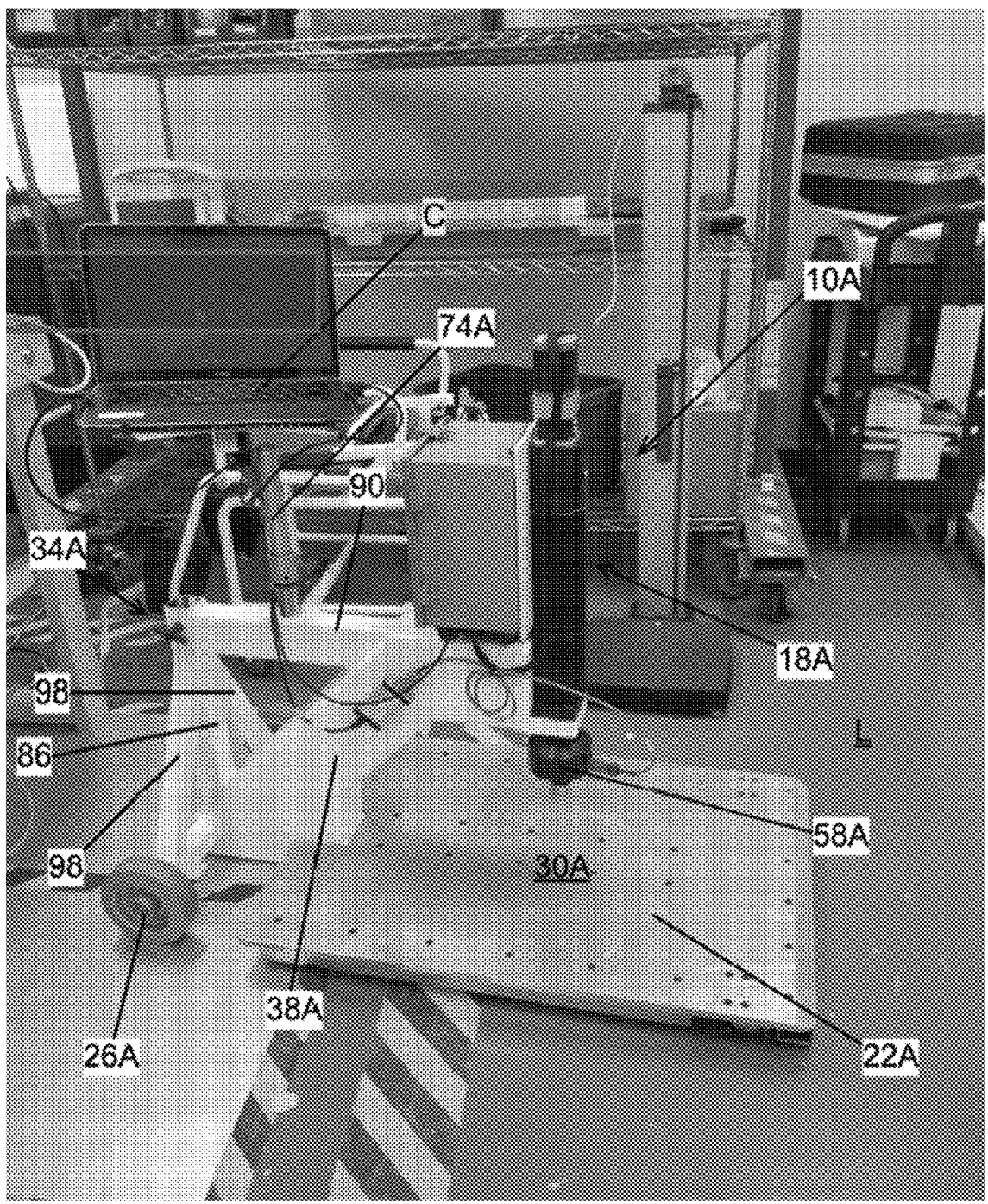
FIG. 8 is a photo of a perspective view of an alternative scale calibration device.

FIGS. 1-7 illustrate a portable, force application device 10 for the calibration, accuracy testing, etc. of a scale S, such as a professional medical scale. FIG. 8 illustrates an alternative construction of the device 10A. In some embodiments, the device 10 may employ test software operating on a computing device C, such as a tablet, laptop, personal computer, desktop, terminal, etc., to monitor an applied force, to log data, and/or to output such data (e.g., provide reports).

Referring to FIGS. 1-4, the device 10 includes a support assembly 14, operable to support the scale S to be calibrated, and a force applying assembly 18 (also called a force applicator), operable to apply a force to calibrate the scale S. The support assembly 14 includes a platform or base 22 supportable on and movable along a surface (e.g., on one or more wheels 26) to a location L, such as a doctor's office, other health/medical facility, health club/gym, a user's home, etc., for calibration of a scale S at the location L. The base 22 has an upper surface 30 on which the scale S is supportable.

A frame assembly 34 is attached to the base 22 and, as illustrated, includes a post 38 fixed to a rear edge of the base 22 supporting side plates 42 extending over the base surface 30. The frame assembly 34 supports the force applying assembly 18 over the base surface 30. The base 22 and the frame assembly 34 are constructed to resist reaction forces resulting from support and operation of the force apply assembly 18 and to limit deflection of the force applying assembly 18 (e.g., to about 0.02 inch (in.) or less) during calibration (e.g., under a load up to about 1,200 lbs. or more).

The frame assembly 34 may be fixed to and non-removable from the base 22 or may be removable from the base 22. In constructions in which the frame assembly 34 is removable from the base 22, the device 10 includes a connecting mechanism (not shown; e.g., a positive connecting mechanism (removable pins, fasteners, etc.), a frictional connecting mechanism (a clamp), etc.) to substantially rigidly connect the frame assembly 34 and the base 22 while limiting deflection of the force applying assembly 18.

The device 10 may also include an indicator mechanism (not shown) operable to indicate connection of the frame assembly 34 and the base 22 in an orientation for use. The indicator mechanism may include a visual indicator (e.g., alignable indicator members on the frame assembly 34 and the base 22).

A sensor assembly (not shown) may sense the relative orientation of the frame assembly 34 and the base 22 and communicate sensed information to the computing device C which may provide the indication. In other constructions, the computing device C may use the sensed information to adjust calibration based on the sensed orientation of the components (e.g., the frame assembly 34, the base 22, the force applying assembly 18, etc.).

As illustrated, the base 22 and the frame assembly 34 are arranged generally in a C-shape and are constructed to optimize support of the force applying assembly 18 generally and during use and the size and the weight of the device 10. For example, the illustrated side plates 42 include a web structure with web portions 46 constructed to resist reaction forces resulting from support and operation of the force applying assembly 18 with material removed to decrease weight.

The force applying assembly 18 simulates a dead weight by applying known amounts of force. The force applying assembly 18 may include any suitable force applying mechanism, such as, for example, a load cell, a piston-cylinder assembly, a hydraulic cylinder, a pneumatic cylinder, a screw jack, a screw lift, a motor-driven gear mechanism, an electromagnet, etc.

The illustrated force applying assembly 18 includes a hydraulic cylinder assembly 50. An actuator 54 is operable to control the hydraulic cylinder assembly 50 to apply a force. A test standard 58 is supported at the end of the assembly 50 to apply the force to the scale S through a load spreader plate 62 (see FIG. 7) engaging the scale S.

An adjustment mechanism (e.g., a hand wheel 66) is operable to position the test standard 58. The adjustment mechanism may provide rapid or coarse adjustment (e.g., axial sliding along threaded rod) to quickly position the test standard 58 as well as fine adjustment (e.g., threaded adjustment).

The illustrated force applying assembly 18 is rigidly connected to but removable from the frame assembly 34. The rigid connections of the frame assembly 34 may prevent or limit inaccuracy in the applied force. Reaction forces from the force applying assembly 18 may be equally transferred to the base 26 through the frame assembly 34.

A handle 70 is connected to the base 22 and the frame assembly 34 and is engageable by a user for transport and positioning of the device 10. The illustrated handle 70 is removable from the base 22 and the frame assembly 34. A work support assembly 74 extends from the post 38 and is operable to support the computing device C in a position for the user to operate the device 10. The work support assembly 74 includes a support shaft 78 connected to the post 38 and a support member 82 on the support shaft 78. The support member 78 is operable to support the computing device C or other materials (e.g., a medical chart, a notebook, medical instruments, etc.) and is adjustable to be positioned for access by the user. The work support assembly 74, as illustrated, is detachable from the frame assembly 34.

The computing device C may be operable to control the operation of the force applying assembly 18, display or otherwise output data, such as a calibration weight being applied, perform other functions, such as, for example, monitoring the calibration/testing operation, communicating with other devices, logging data, maintaining data, providing reports, controlling the movement of the device 10.

The device 10 may have of any suitable dimensions to be transportable to and around a location (e.g., through a standard doorway) and to support and perform functions on a variety of scales. In certain embodiments, the device 10 has a height of approximately 52.25 in., a width of approximately 31.5 in., and a length of approximately 49.5 in. While being able to provide the minimum calibration weight of at least 300 lbs., the illustrated device 10 has a weight less than or equal to about 300 lbs. or even less than or equal to about 250 lbs.

The device 10 is moved to and positioned in the location for calibration of a scale S. Operation of the device 10 to calibrate or test a scale S may begin with starting the computing device C and the associated device program. The test standard 58 is configured in the appropriate window of the program, and the test series is selected (or configured). When these steps are complete, the device 10 is allowed to "warm-up" for approximately 10 minutes.

The scale S to be tested or calibrated is positioned on surface 30 of the base 22 such that the center of the weighing platform P of the scale S is directly below the test standard 58. The scale S is turned on. The load spreader plate 62 is placed on the scale platform P with the load target directly below the force application point of the test standard 58. The scale S is "zeroed" to account for the weight of the load spreader plate 62. The rapid/coarse movement hand wheel 66 is used to lower the test standard force application point to contact with the load spreader target, resulting in a small amount of force being applied to the scale S.

The actual test force is applied to scale S by turning the actuator 54 (the small hand wheel) to establish the target level of force (as a proxy for a test weight) on the scale S. Data that relates the indicated weight of the test standard 58 to the indicated weight for the scale S is collected. The data is stored, analyzed, output, etc. (e.g., along with collection of at a later time). The device 10 may be operated to calibrate and test the scale S across a load range (e.g., across the entire rated load range of the scale 5).

In the illustrated construction, the actuator 54 of the hydraulic cylinder assembly 50 is operated manually to operate the device 10 and calibrate the scale S. In other constructions, the force applying assembly 18 may be controlled by the computing device C to apply forces to the scale S. The program may select a weight/force to be applied, and the force applying assembly 18 may be adjusted to apply the selected force. The operation is continued through calibration of the scale S.

FIG. 8 illustrates an alternative construction of a scale calibration device 10A. The device 10A is similar to the device 10 described above and shown in FIGS. 1-7, and common elements have the same reference number "A".

In the illustrated device 10A, the base 22A and the frame assembly 34A are arranged generally in a C-shape and are constructed to resist reaction forces resulting from support and operation of the force applying assembly 18A and to limit deflection of the force applying assembly 18A. The illustrated frame assembly 34A includes an angled post 38A connected to the base 22A. A generally vertical first member 86 extends from a rear portion of the post 38A, and a generally horizontal second member 90 connects the upper portion of the first member 86 and the post 38A. The handle (not shown) is removably connectable to the first member 86.

A wheel support 94 extends from opposite lateral sides of the post 38A, and reinforcing members 98 are connected between the outer ends of the wheel support 94 and the first member 86. The rear wheels 26A are positioned on the wheel support 94 at a width no more than the width of a standard truck ramp (e.g., no more than about 24 in.) while still providing a steady and stable support during transport.

To facilitate transportation of the device 10A, at least a portion of the frame assembly 34A may be removable from the base 22A. For example, the post 38A may be disconnectable from the base 22A so that the base 22A and the frame assembly 34A are movable separately and independently. The frame assembly 34A may be subdivided—the post 38A may be disconnectable from the first and second members 86, 90, the reinforcing members 98, etc. The device 10A includes a connection mechanism to substantially rigidly connect the base 22A and the frame assembly 34A and to limit deflection in use.

Figure 9:
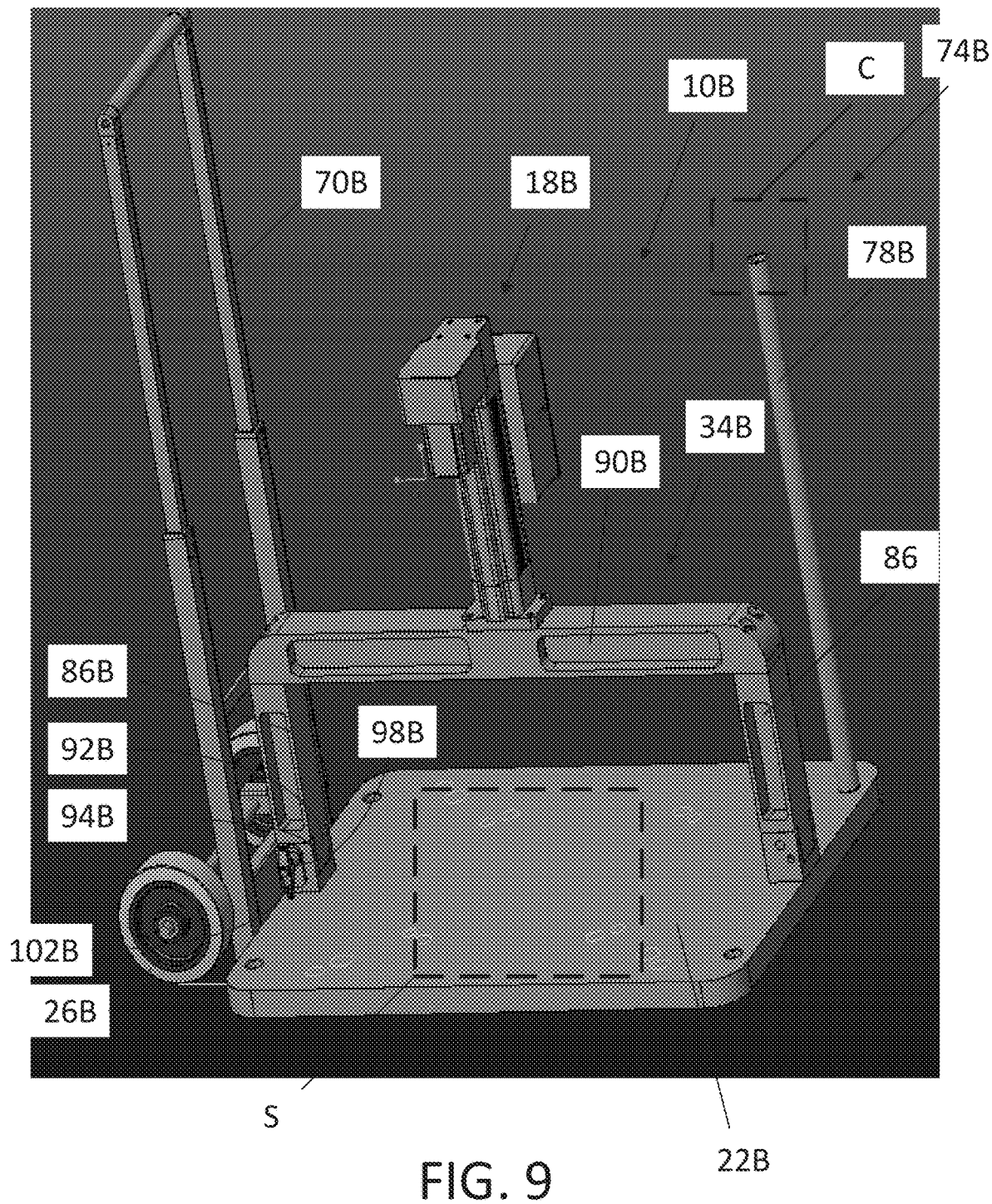
FIG. 9 is a top perspective view of another alternative scale calibration device.
Figure 10:
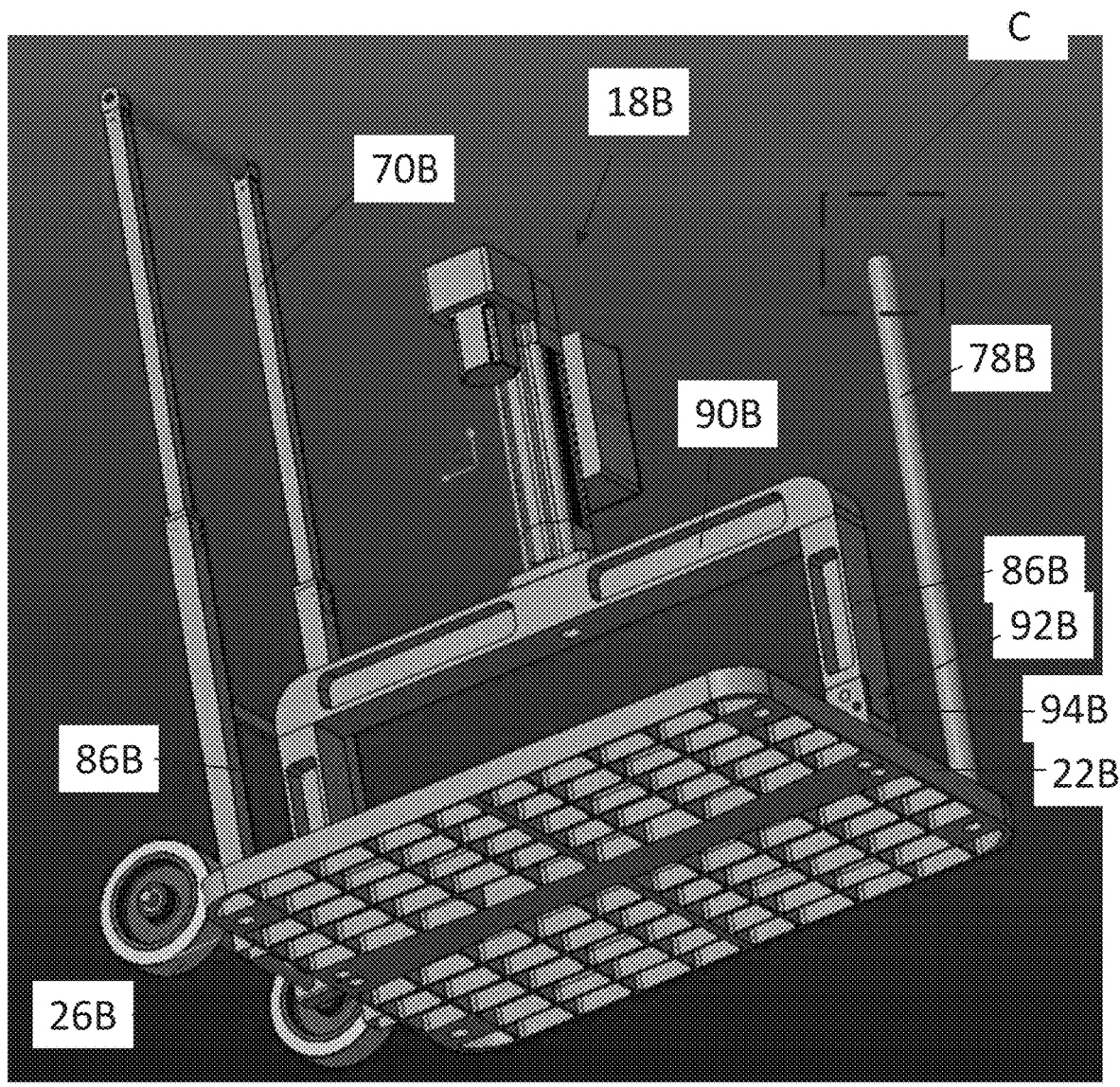
FIG. 10 is a bottom perspective view of the device of FIG. 9.
Figure 11:
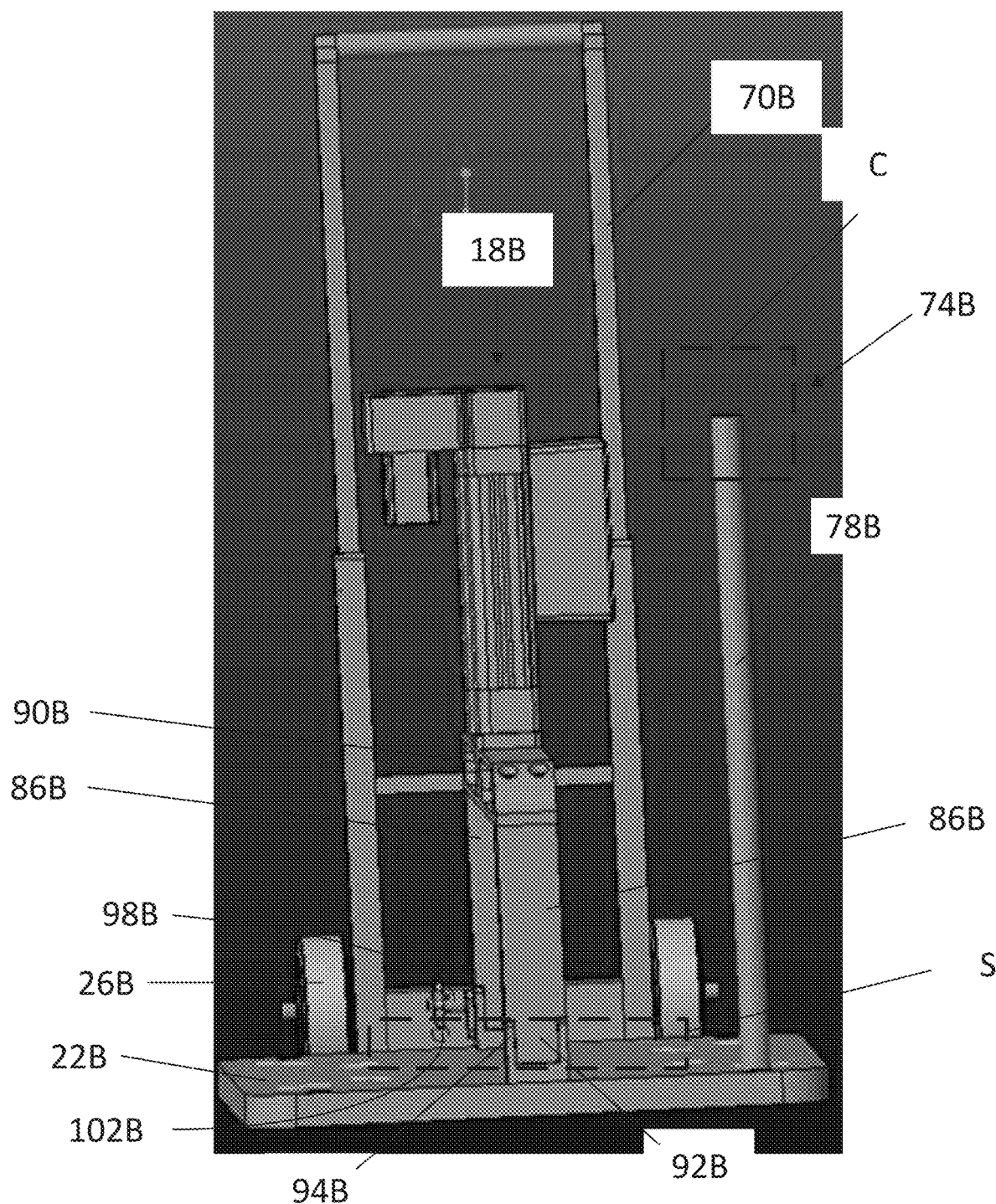
FIG. 11 is a front perspective view of the device of FIG. 9.
Figure 12:
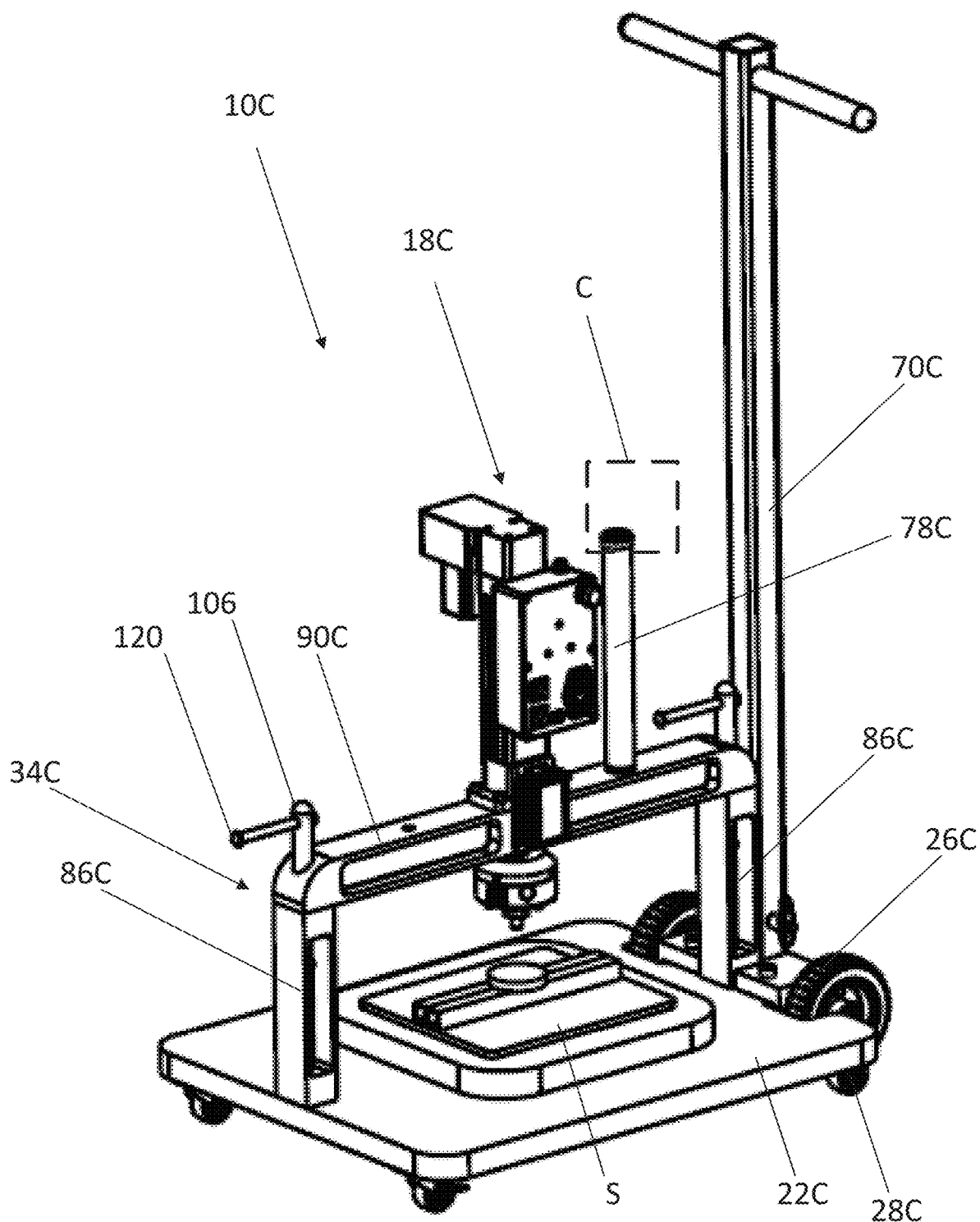
FIG. 12 is a top perspective view of yet another alternative scale calibration device.
Figure 13:
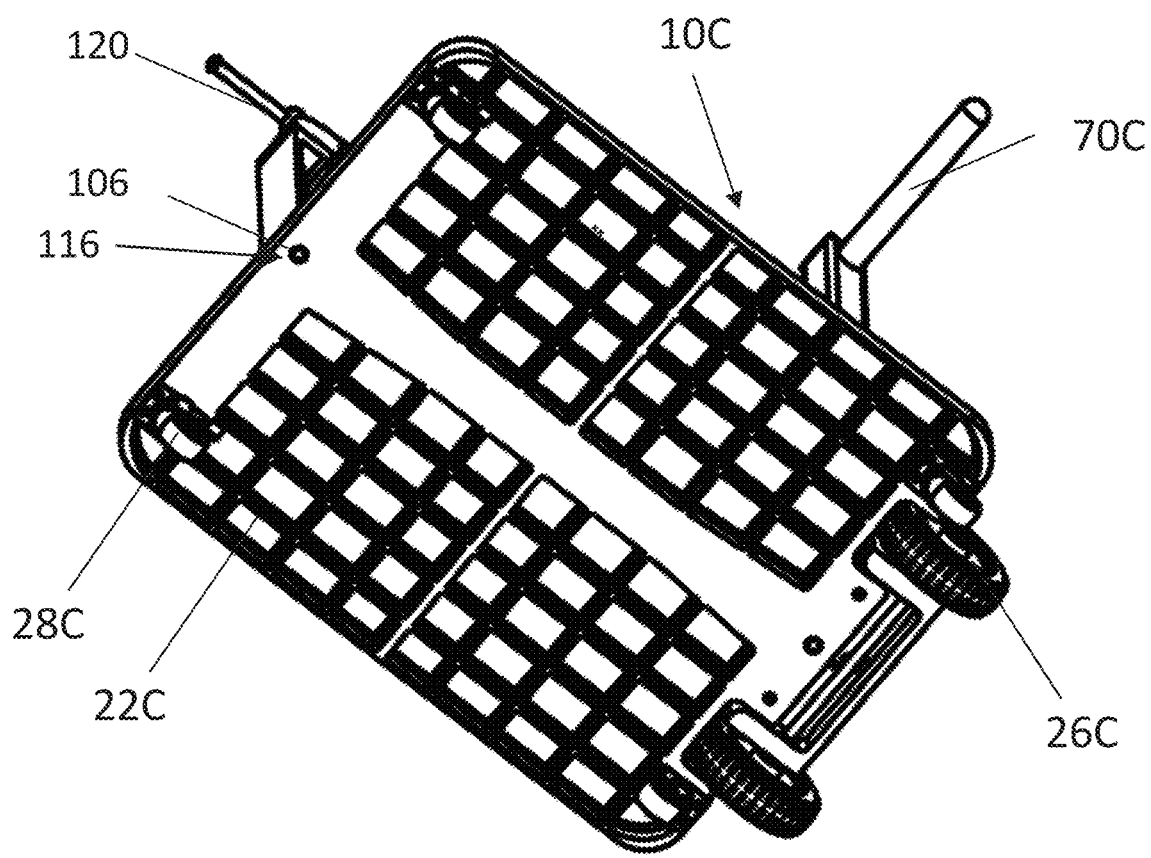
FIG. 13 is a bottom perspective view of the device of FIG. 12.
Figure 14:
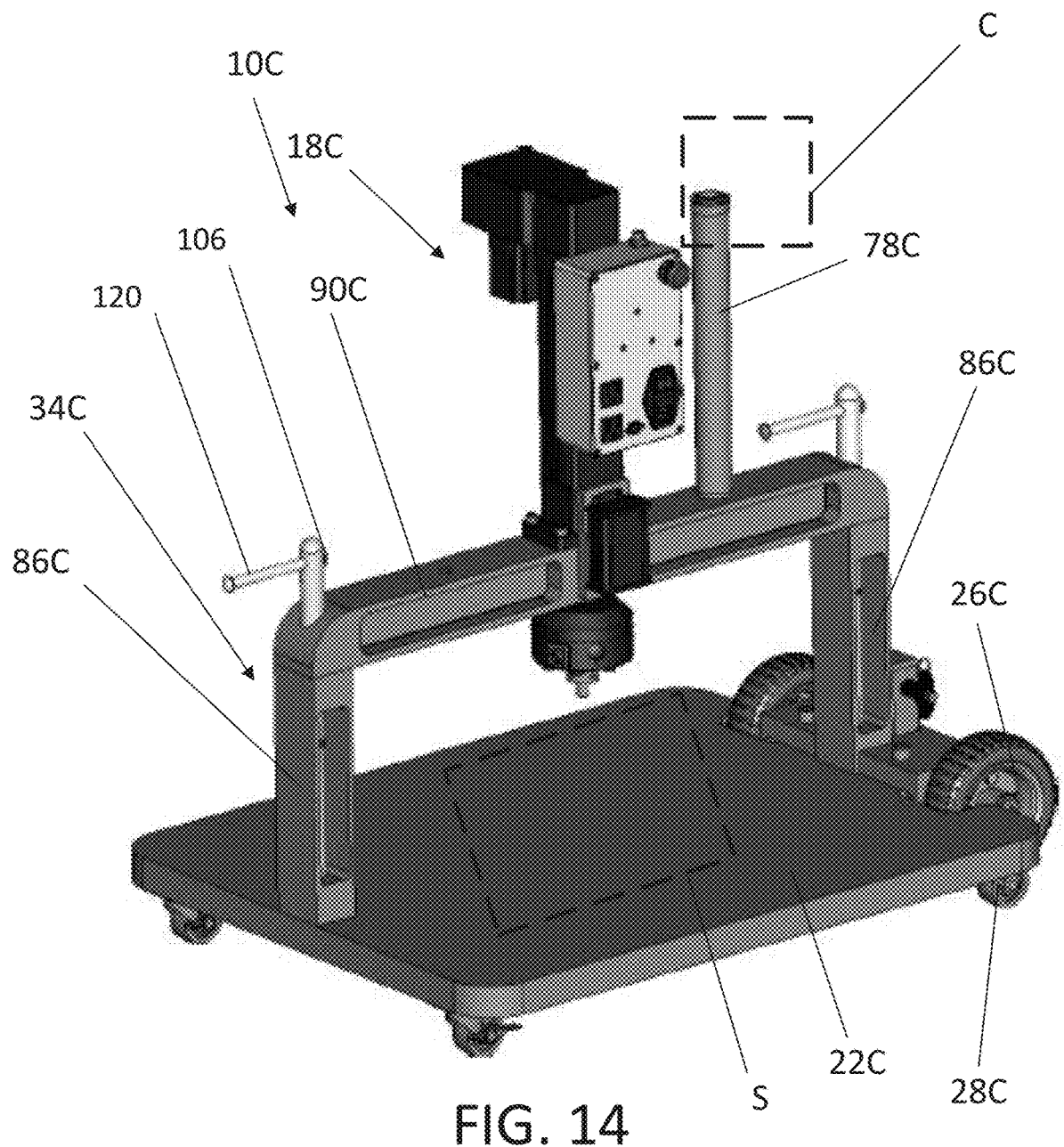
FIG. 14 is a top perspective view of the device of FIG. 12, illustrated with the handle removed.

FIGS. 9-11 illustrate another alternative construction of a portable, force application device 10B for calibration, accuracy testing, etc. of a scale S. The device 10B is similar to the device 10, 10A described above and shown in FIGS. 1-8, and common elements have the same reference number "B".

In the device 10B, the frame assembly 34B is arranged generally as an arch or bridge and is connected to the base 22B to resist reaction forces resulting from support and operation of the force applying assembly 18B. Such an arrangement limits deflection of the force applying assembly 18B, for example, in a direction towards or away from the base 22B, during application of the load.

The illustrated frame assembly 34B includes two generally vertical first members (i.e., columns, beams, uprights 86B, etc.) and a generally horizontal second member (i.e., a span, a bridge, a beam, a crossmember 90B, etc.). The illustrated members 86B, 90B have material removed from one or more walls (e.g., recesses) to, for example, reduce the weight, material, etc. of these components. The uprights 86B are attached at opposing sides of the base 22B. The uprights 86B extend substantially perpendicularly from the base 22B.

The second member 90B extends substantially parallel to the base 22B and spans a gap between the uprights 86B. The illustrated second member 90B is substantially linear but, in other constructions (not shown), could be curved, arched, combination curved and linear, etc. In the illustrated embodiment, the second member 90B is separate from and fastened to the uprights 86B (e.g., by fasteners). In other embodiments (not shown), the second member 90B may be integral with the uprights 86B.

In the illustrated embodiment, the force applying assembly 18B is positioned on the second member 90B (e.g., substantially at a midpoint between each of the uprights 86B) to promote equal loading on the uprights 86B and vertical loading of the force applying assembly 18B. As a result, angular deflection of the force applied to the scale S to be calibrated in limited.

At least a portion of the frame assembly 34B may be adjustable relative to and/or removable from the base 22B. For example, the crossmember 90B (with or without the force applying assembly 18B) may be disconnectable from the uprights 86B and from the base 22B to be movable separately and independently from other components of the device 10B.

In the illustrated construction, the frame assembly 34B is hingedly connected to the base 22B to permit pivoting movement relative to the base 22B, for example, to allow the scale S to be placed on the base 22B, for removal from the base 22B, etc. The illustrated connection mechanism between the upright(s) 86B and the base 22B includes a hinge 92B, a hinge clevis 94B, and a clevis pin 98B. The illustrated hinge 92B is a quick connect hinge pivotably connecting the hinge 92B (e.g., on the upright 86B) with the hinge clevis 94B (e.g., on the base 22B). The clevis pin 98B is engageable in the hinge clevis 94B. The clevis pin 98B is engageable (at 102B) to move the clevis pin 98B into and out of engagement with the hinge clevis 94B to selectively connect and disconnect, respectively, the upright 86B and the base 22B.

In the connection mechanism, the reaction force to the load applied by the force applying assembly 18B is transferred through the crossmember 90B and the uprights 86B to the base 22B through the hinge 92B to the hinge clevis 94B without transmission through the clevis pin 98B. As such, the major components of the frame assembly 34B (e.g., the members 86B and 90B) are constructed (e.g., made of selected material(s), dimensioned, etc.) to withstand the load.

The illustrated frame assembly 34B can be simplified as a center-loaded simply-supported beam with the crossmember 90B functioning as the beam and the force applying assembly 18B providing the force. Deflection of the crossmember 90B can be calculated based on the force acting on the center of the beam, the length between the uprights 86B, the modulus of elasticity of the crossmember 90B, the area moment of inertia of the cross section of the crossmember 90B, etc. As such, to minimize deflection of the crossmember 90B, the modulus of elasticity and the area moment of inertia of the crossmember 90B can be maximized. In other words, a high modulus of elasticity material (e.g., steel) with a large area moment of inertia (e.g., an "I" beam) will limit deflection and may improve the accuracy of the device 10B. In the illustrated embodiment, the crossmember 90B is formed of a lightweight aluminum capable of withstanding expected loads while limiting the weight of the device 10B for ease of transport, use, etc.

The device 110B includes rear wheels 26B operable to move the device 10B along a surface for transport of the device 10B. A telescoping handle 70B extends from the base 22B to enable a user to move the device 10B. A work support assembly 74B, including a post 78B, is operable to support a computing device C. The handle 70B and/or the support assembly 74B may be removable.

FIGS. 12-23 illustrate yet another alternative construction of a scale calibration device 10C. The device 10C is similar to the device 10, 10A, 10B described above and shown in FIGS. 1-11, and common elements have the same reference number "C".

As in the device 10B, the frame assembly 34C is arranged generally as an arch or bridge and is connected to the base 22C to resist reaction forces resulting from support and operation of a force applying assembly 18C. The illustrated members 86C, 90C have material removed from one or more walls (e.g., through openings in walls of the uprights 86C, recesses in the cross member 90C) to, for example, reduce the weight, material, etc. of these components.

As shown in FIG. 15, the force applying assembly 18C extends transverse to the axis of the cross member 90C. In other constructions (not shown), the force applying assembly 18C may be aligned with and extend along the cross member 90C (e.g., with the motor and the gear mechanism pivoted 90° from the position shown in FIG. 15 to lie substantially over the cross member 90C). In illustrated constructions, the motor may include a stepper motor (as shown), a servo motor, etc., and the gear mechanism may include a worm gear mechanism (as shown) or other type of gear mechanism. In other constructions (not shown), the force applying assembly 18 may include other mechanisms to output linear motion to apply the calibration force.

In the illustrated construction, the frame assembly 34C is removable from the base 22C, with the uprights 86C being disconnectable from the base 22C. By removing the frame assembly 34C from the base 22C, the device 10C is separated into components weighing significantly less (e.g., about 50-75 lbs. each) than the device 10C itself (e.g., about 100-150 lbs.).

A connection mechanism removably connects the frame assembly 34C to the base 22C. The illustrated connection mechanism provides a toolless, quick-connection between the frame assembly 34C and the base 22C. The connection mechanism substantially rigidly connects the frame assembly 34C to the base 22C while limiting deflection of the force applying assembly 18C to, for example, substantially minimize or eliminate inaccuracy that could result from improper or inadequate connection of the frame assembly 34C and the base 22C.

In the illustrated construction, a bolt 106 extends through a receptacle 110 in the crossmember 90C, through a receptacle 114 in the uprights 84C and into a receptacle 116 in the base 22. The illustrated bolt 106 threadedly engages the base receptacle 116 (e.g., through inter-engaging threaded portions 108, 109, respectively). The threaded connection provides a substantially rigid and accurate connection of the frame assembly 34C and the base 22C.

The illustrated bolts 106 are stainless steel bolts. As illustrated, the base 22C is formed of a different and less hardened material (e.g., aluminum), and, to prevent the bolts 106 from "stripping" threaded receptacles formed in the base 22C, each receptacle 116 may be provided by a hardened insert 118 (e.g., formed of stainless steel or compatible hardened material) connected to the base 22C. In other constructions, the inserts 118 and/or the bolts 106 may be formed of materials other than stainless steel, such as other hardened material(s).

A handle 120 at one end is engageable to rotate and thread the bolt 106 relative to the base 22C to secure (or remove) the frame assembly 34C to the base 22C. The illustrated handle 120 slides through the bolt 106 to be operable on either side of the bolt 106.

The illustrated bolts 106 are retained in the frame assembly 34C when the frame assembly 34C is removed from the base 22C (e.g., by an O-ring supported on each bolt 106). Each bolt 106 may be removed from the frame assembly 34C, and, with the bolts 106 removed, the crossmember 90C (with or without the force applying assembly 18C) may be removed from the uprights 86C. Pins (one shown at each end in FIG. 18) position the members 86C, 90C.

It should be understood that, in other constructions (not shown), the connection mechanism may include different structure to removably connect the frame assembly 34C to the base 22C. For example, the connection mechanism may include a bayonet, a clevis pin, a ¼ turn connection, etc. operable to connect each bolt 106 to the base 22C.

Figure 18:
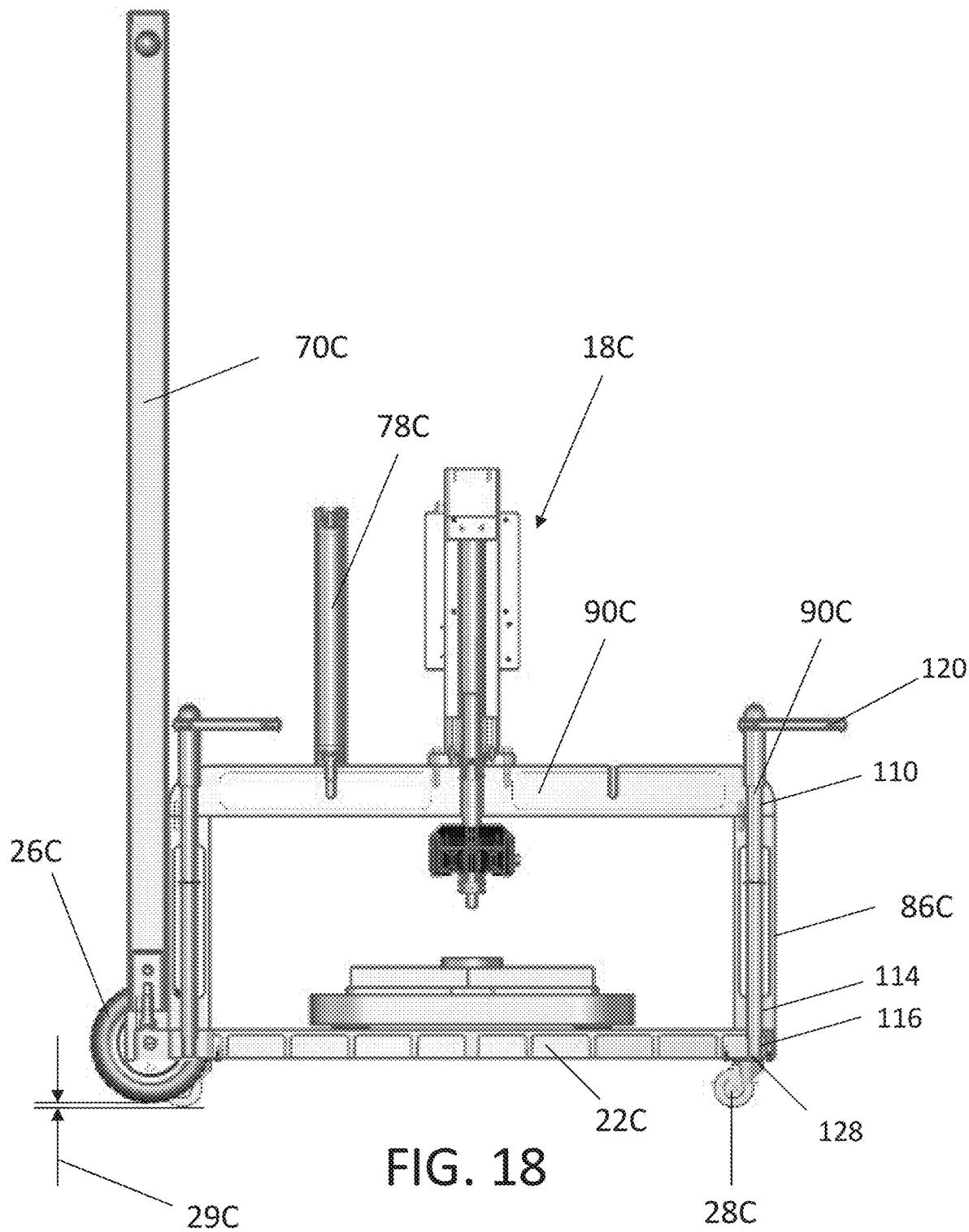
FIG. 18 is a cross-sectional view of the device of FIG. 12, taken generally along line 18-18 of FIG. 15.
Figure 19:
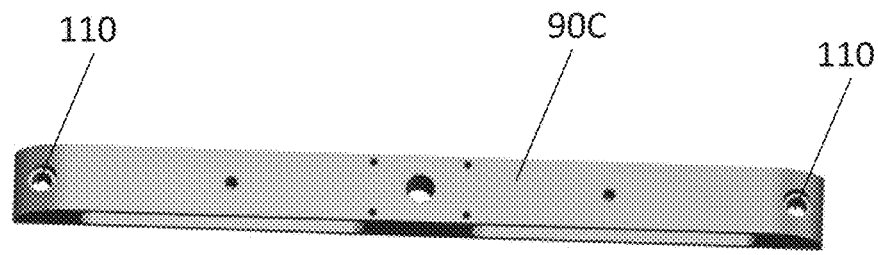
FIG. 19 is a top perspective view of a span of the device of FIG. 12.
Figure 20:
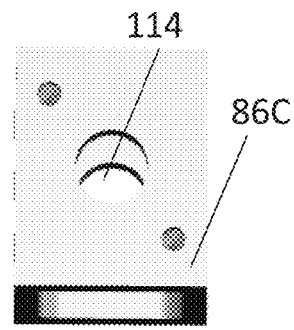
FIG. 20 is a top perspective view of a column of the device of FIG. 12.
Figure 21:
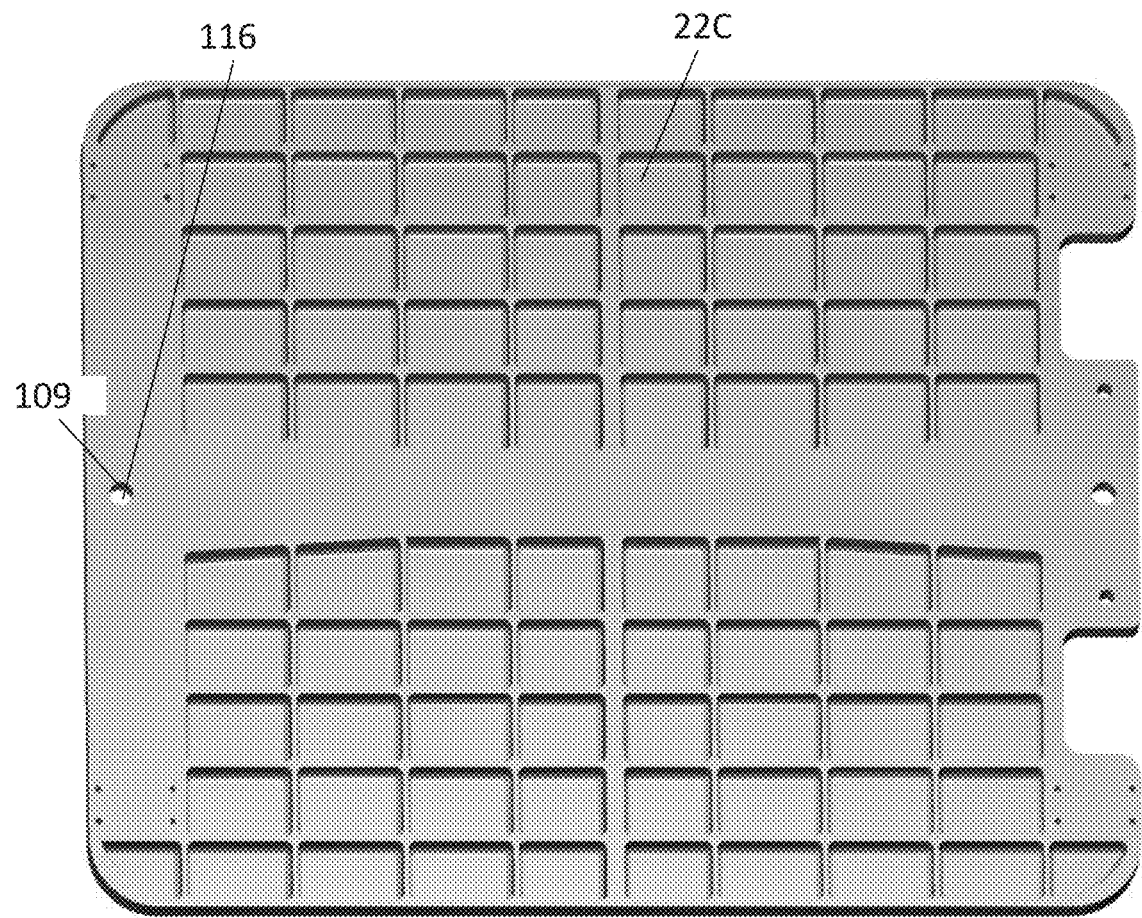
FIG. 21 is a bottom perspective view of the base of the device of FIG. 12.
Figure 22:
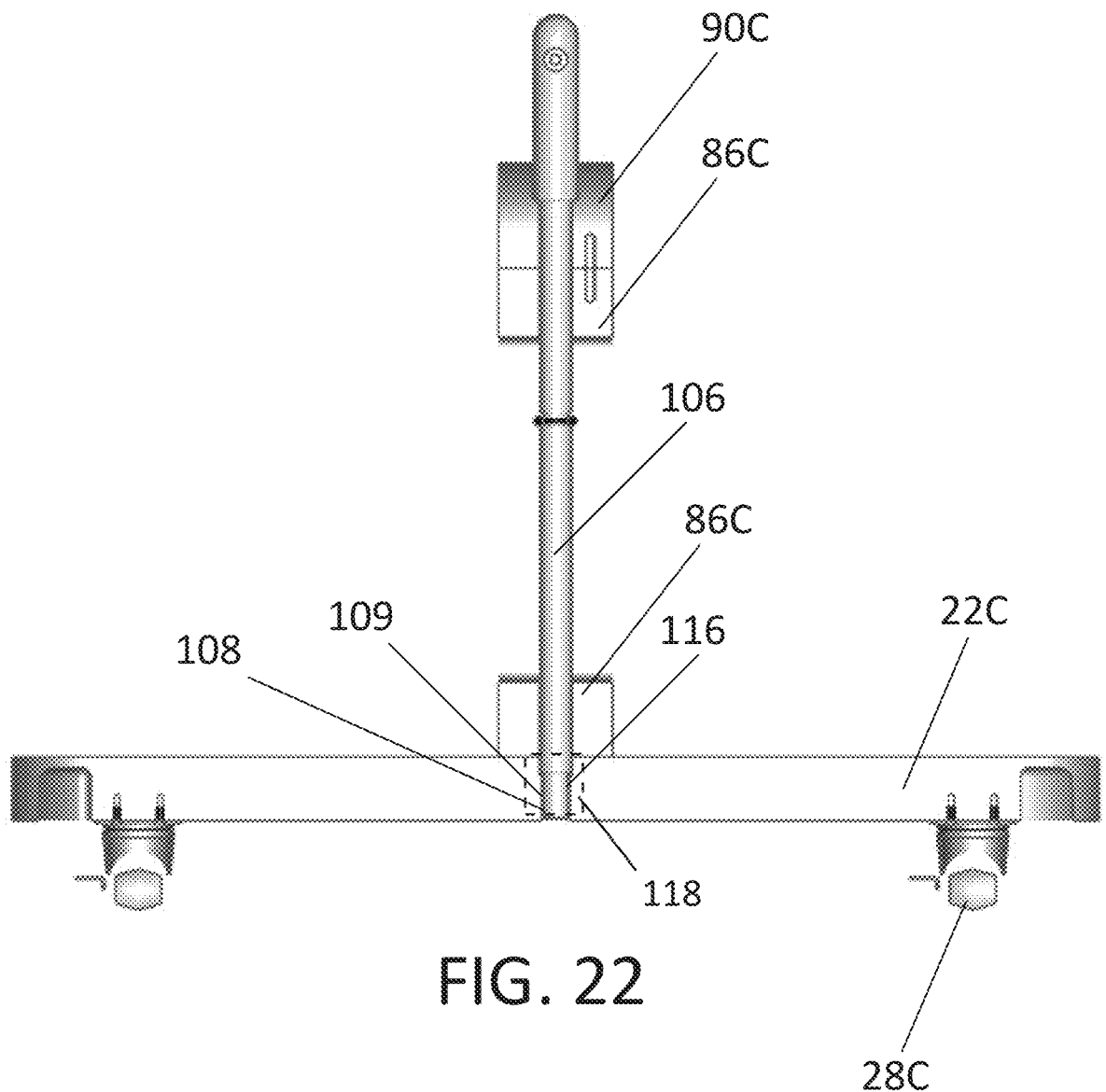
FIG. 22 is a cross-sectional view of the device of FIG. 12, taken generally along line 22-22 of FIG. 15.
Figure 23:
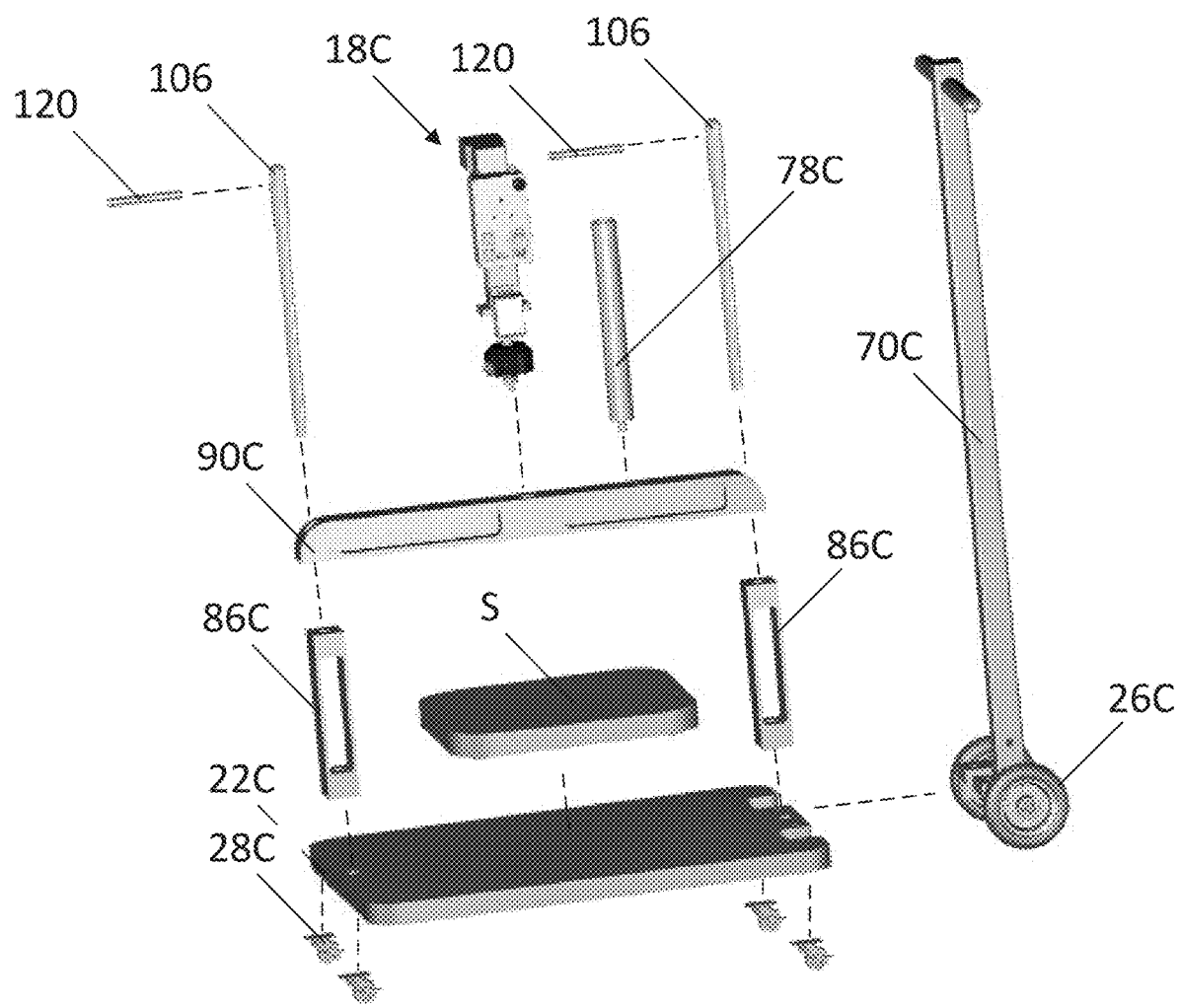
FIG. 23 is an exploded view of the device of FIG. 12.

In addition to rear wheels 26C, caster wheels 28C are mounted on the bottom of the base 22C. The caster wheels 28C, the wheels 26C, or a combination can be used to move the device 10C to a desired location L. As illustrated in FIG. 18, with the caster wheels 28C engaging the surface, a clearance 29C is provided between the surface and the wheels 26C. The caster wheels 28C may be locked once the device 10C is in a desired location L. The device 10C may be pivoted from the position shown in FIG. 18 to engage the wheels 26C with the surface and disengage the caster wheels 28C.

A removable T-handle 70C is connected to the base 22C. The support assembly 74C, including the shaft 78C, is removably supported by the frame assembly 34C. As shown in FIG. 18, the crossmember 90C provides locations on opposite sides of the force applying assembly 18C to support the shaft 78C.

Figure 24:
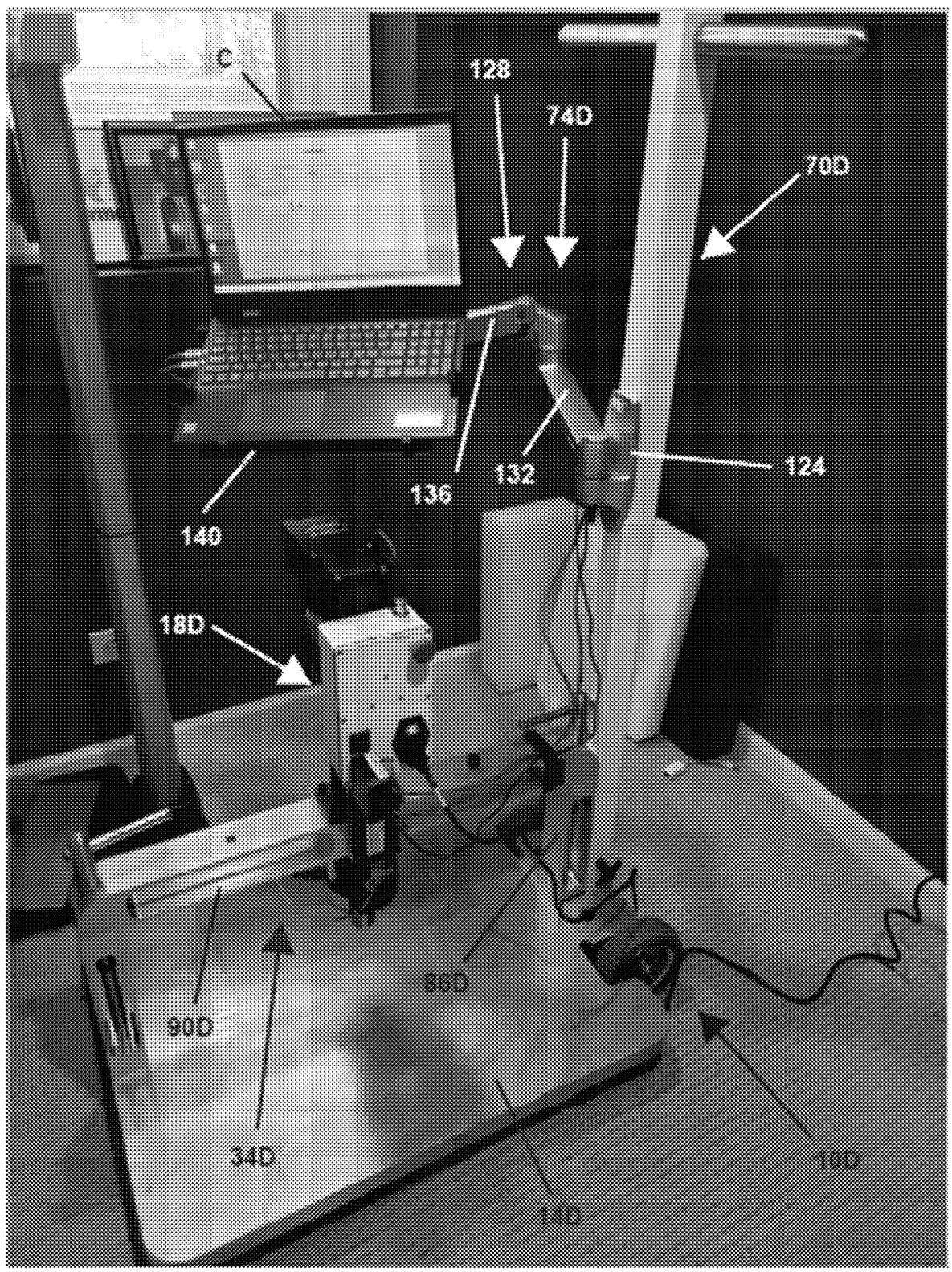
FIG. 24 is a photograph of a further alternative scale calibration device.
Figure 25:
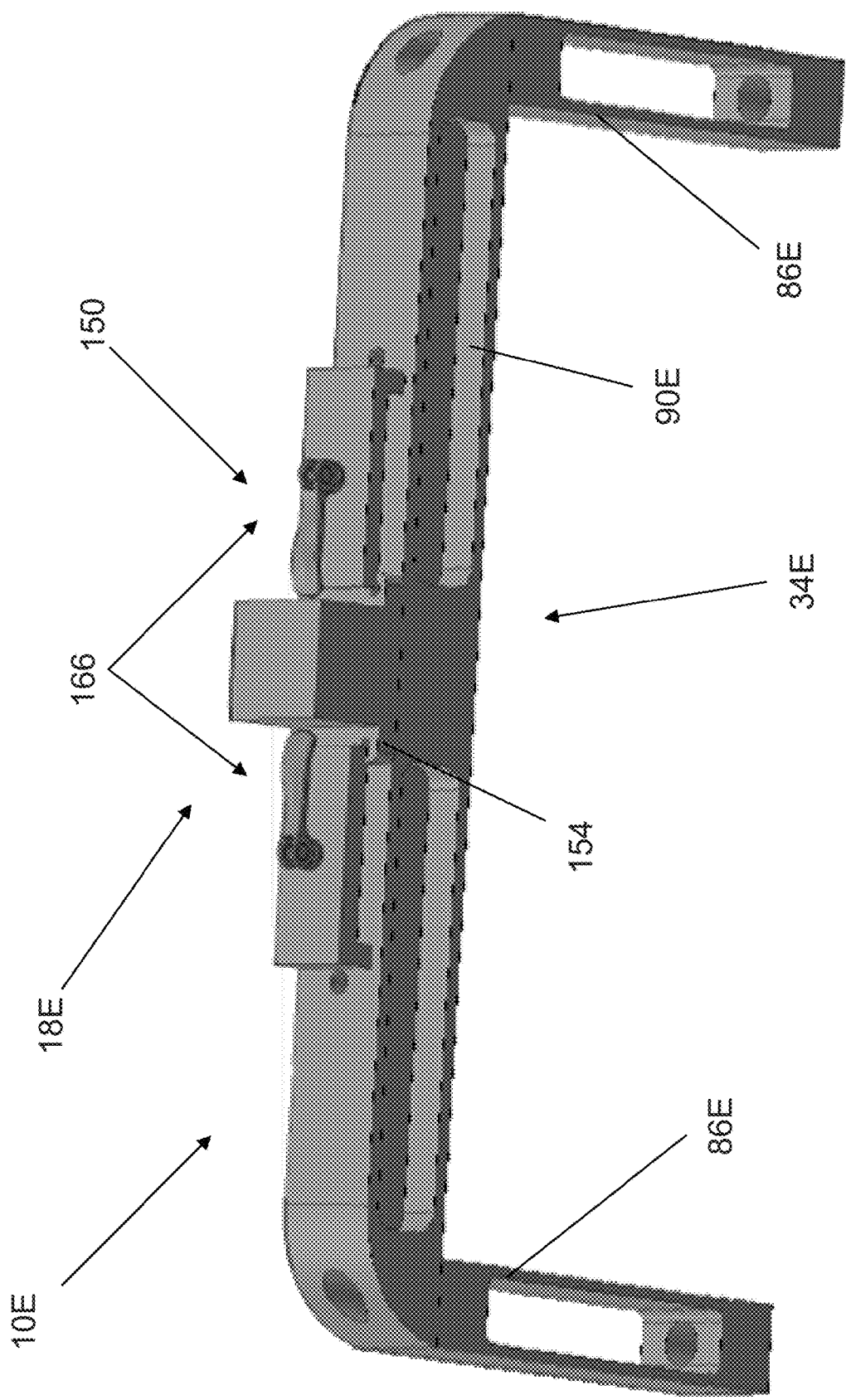
FIG. 25 is a perspective view of an alternative construction of a bridge assembly.

FIG. 24 illustrates a further alternative construction of a scale calibration device 10D. The device 10D is similar to the device 10, 10A, 10B, 10C described above and shown in FIGS. 1-23, and common elements have the same reference number "D".

As shown in FIG. 24, a handle 70D is connected (e.g., removably) to the base 22D. The support assembly 74D, including a connector 124 and a pivoting arm assembly 128, is supported by the handle 70D. Positioning the support assembly 74D on the handle 70D rather than the frame assembly 34D "disconnects" any force (e.g., vibration) caused by working on the computing device C (e.g., keyboarding) from the calibration operation.

The illustrated arm assembly 128 includes a first arm 132 connected to and pivotable at least 180° (e.g., up to about 210°) about relative to the connector 124. A second arm 136 is pivotably connected to the first arm 132 and includes a tray 140 for supporting and retaining the computing device C. The second arm 136 accommodates pivoting movement about a vertical axis and about a horizontal axis to position the computing device C for use.

As illustrated, the support assembly 74D is removably supported on the handle 70D. The illustrated handle 70D provides multiple locations (e.g., on opposite sides towards (as shown in FIG. 24) and away from (not shown) the force applying assembly 18D) to support the support assembly 74D. As shown, the support assembly 74D is positioned within the "calibration envelope" in which a scale S to be calibrated is supported and is movable over the crossmember 90D and the force applying assembly 18D. In other locations (e.g., on the opposite side of the handle 70D), the support assembly 74D is outside of the calibration envelope.

As shown in FIG. 24, the handle 70D is positioned against the upright 86D. In other constructions (not shown), the handle 70D is spaced from the upright 86D to, for example, increase the size of the calibration envelope (e.g., for a scale S that extends past the upright 86D), further disconnect force from the support assembly 74D/computing device C from the calibration operation (e.g., the force will not travel through the handle 70D to the upright 86D).

FIGS. 25-33 illustrate a portion of another alternative construction of a scale calibration device 10E. The device 10E is similar to the device 10, 10A, 10B, 10C, 10D described above and shown in FIGS. 1-24, and common elements have the same reference number "E".

The scale calibration device 10E includes a connection mechanism 150 to removably connect a force applying assembly 18E to a frame assembly 34E. By removing the force applying assembly 18E from the frame assembly 34C, these components are separated into individual components weighing significantly less (e.g., about 35-40 lbs. each) than when assembled (e.g., about 50-75 lbs.). When combined with the removable frame assembly (e.g., the frame assembly 34C, described above), the device 10E may be separated into several individual components of more manageable size, weight, etc., for transport, assembly, storage, etc.

The force applying assembly 18E includes a base 154 supportable on the horizontal frame member 90E, and a positioning arrangement (see FIGS. 30-31) is provided between the base 154 and the frame member 90E to orient the force applying assembly 18E on the frame assembly 34E. The arrangement includes a number of projections 158 (e.g., pins supported on the frame member 90E (three shown of four)) receivable in complementary recesses 162 (e.g., defined in the base 154 (also three shown of four). The illustrated positioning arrangement limits the number of relative orientations of the force applying assembly 18E and the frame assembly 34E (e.g., the orientation shown in FIGS. 25-33 and the opposite orientation (e.g., pivoted 180°; not shown)).

The connection mechanism 150 is selectively engaged between the force applying assembly 18E and the frame assembly 34E and provides a relatively quick, toolless connection/disconnection of the assemblies 18E, 34E. As illustrated, the connection mechanism 150 includes at least one clamp assembly 166 (two shown) connected to the frame member 90E and engageable with the base 154 of the force applying assembly 18E.

In the illustrated construction, each clamp assembly 166 includes (see FIG. 29) a block 170 connected to the frame member 90E by an over-center clamp 174. The illustrated block 170 has a generally L-shape with a short leg 178 engaging the frame member 90E and a long leg 182 engageable with the base 154. As illustrated, the end of the leg 178 is curved to provide allow limited pivoting movement of the block 170 relative to the frame member 90E and to provide contact along a line. In the illustrated construction, the end of the leg 182 has a notch 186 to receive an edge of the base 154.

The clamp 174 includes a threaded stud 190 and an actuator handle 194 connected to the stud 190 at a cam end 198. In the position shown in FIGS. 25-29, the cam end 198 is pivoted to a clamping position, in which the clamp 174 applies a clamping force to the block 170 and thereby to the base 154 of the force applying assembly 18E. The stud 190 is threaded into and out of the frame member 90E to adjust the clamping force (e.g., to accommodate manufacturing tolerances, wear, etc.), for installation, replacement, etc. of the clamp assembly 166. As shown in FIGS. 30-33, the handle 194 is pivotable relative to the stud 190 to release the clamping force applied to the block 170 and to the base 154.

Figure 30:
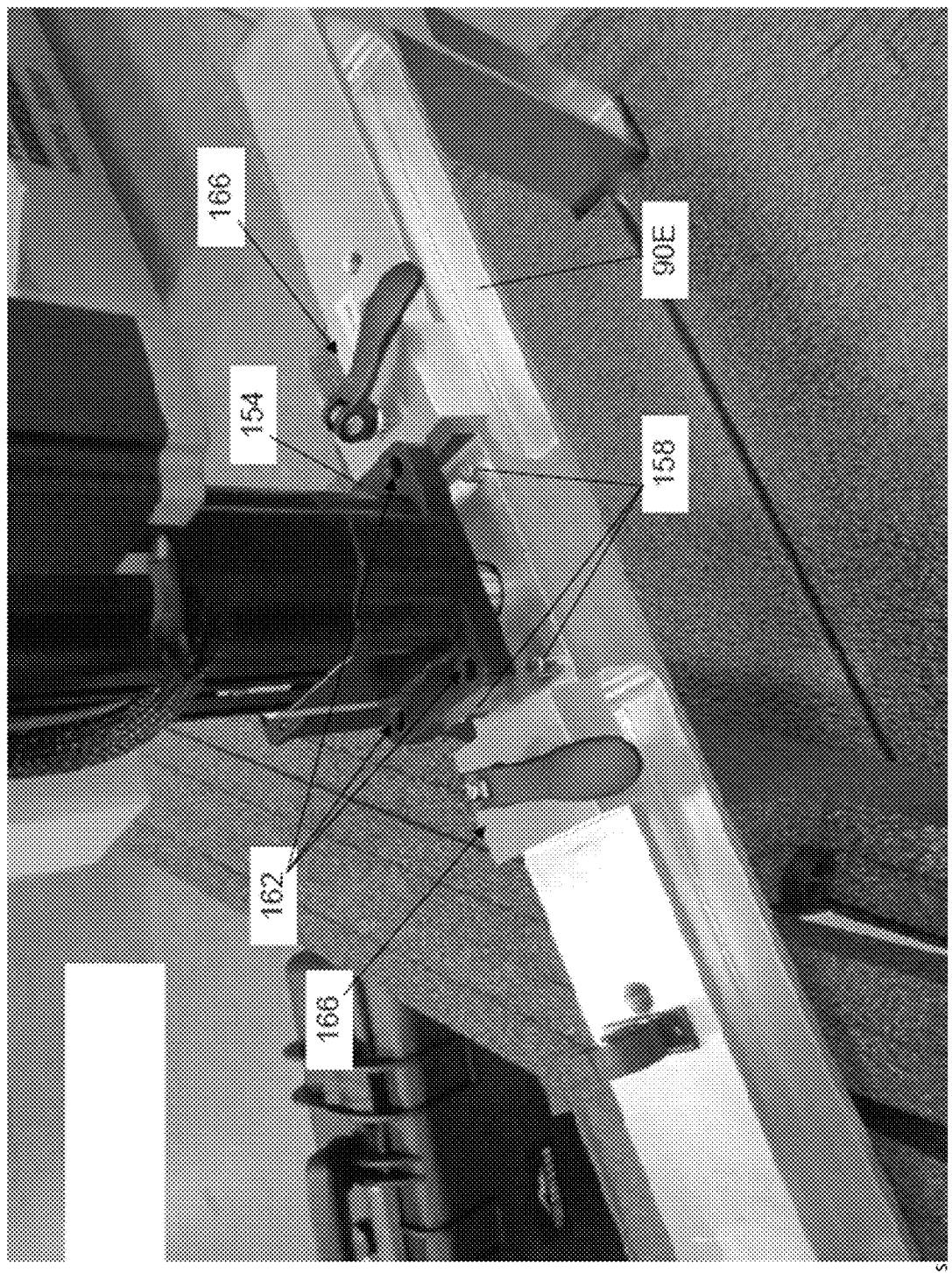
FIGS. 30-33 are photographs illustrating connection of the bridge assembly.
Figure 31:
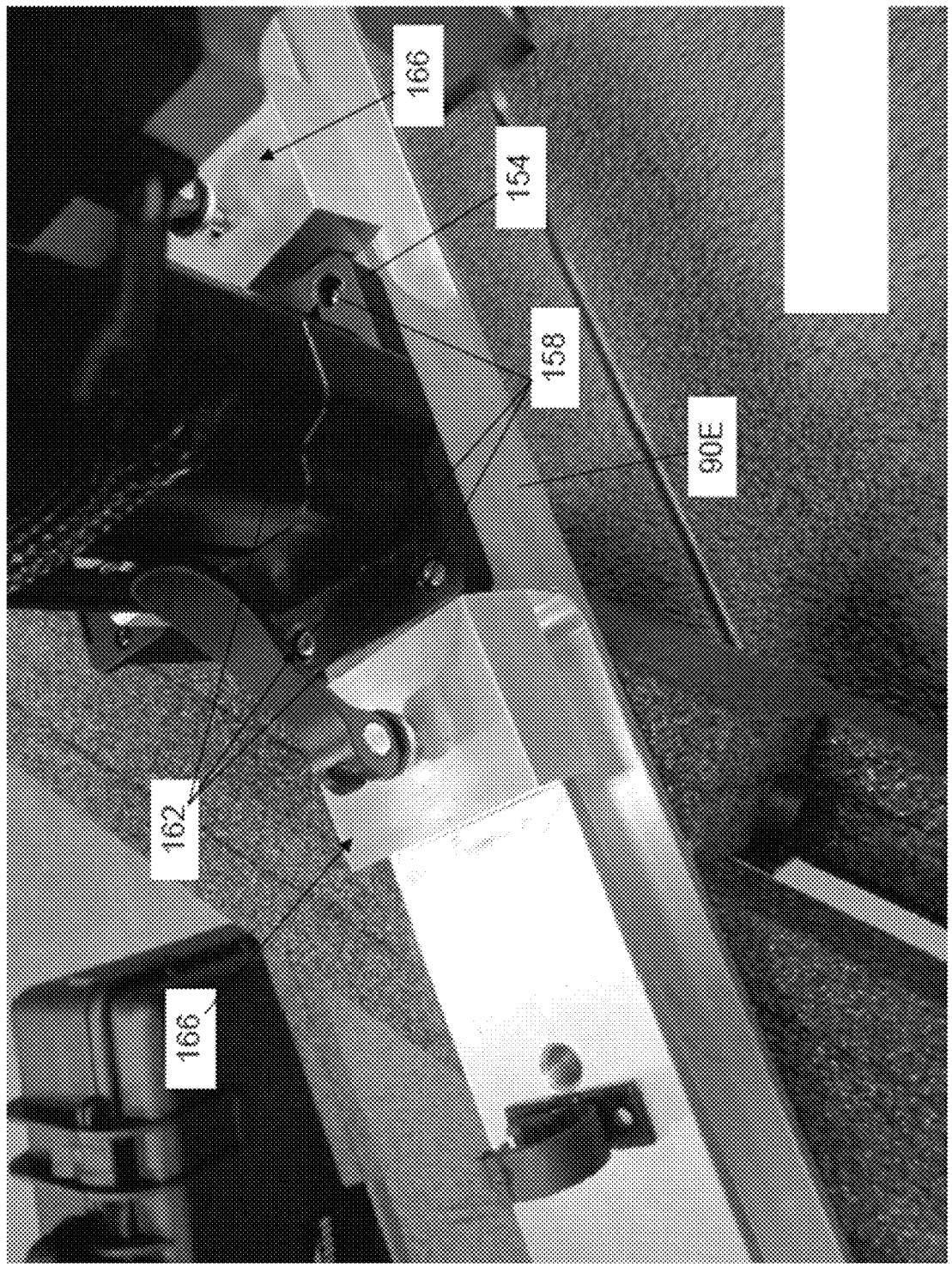
Figure 32:
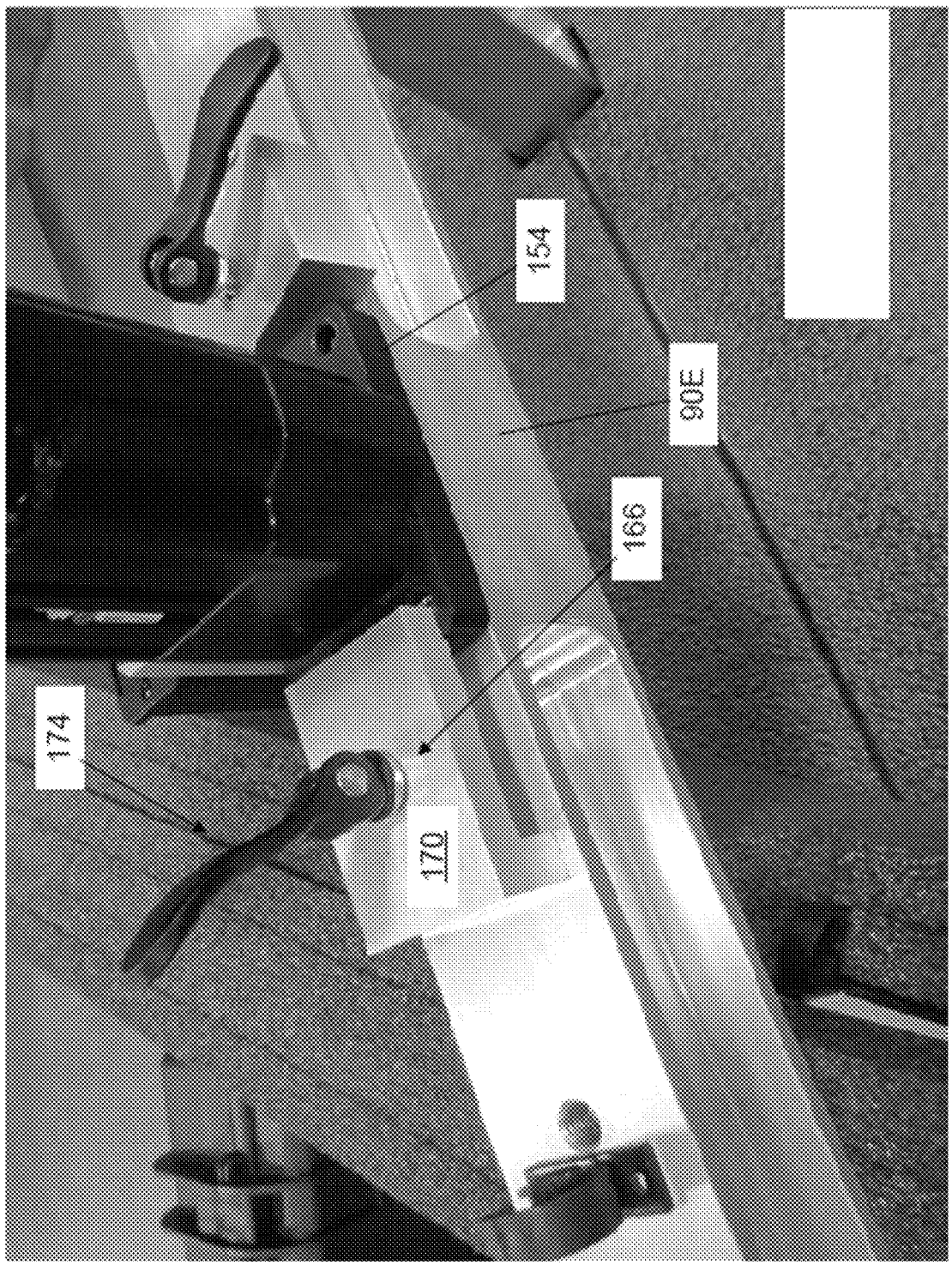
Figure 33:
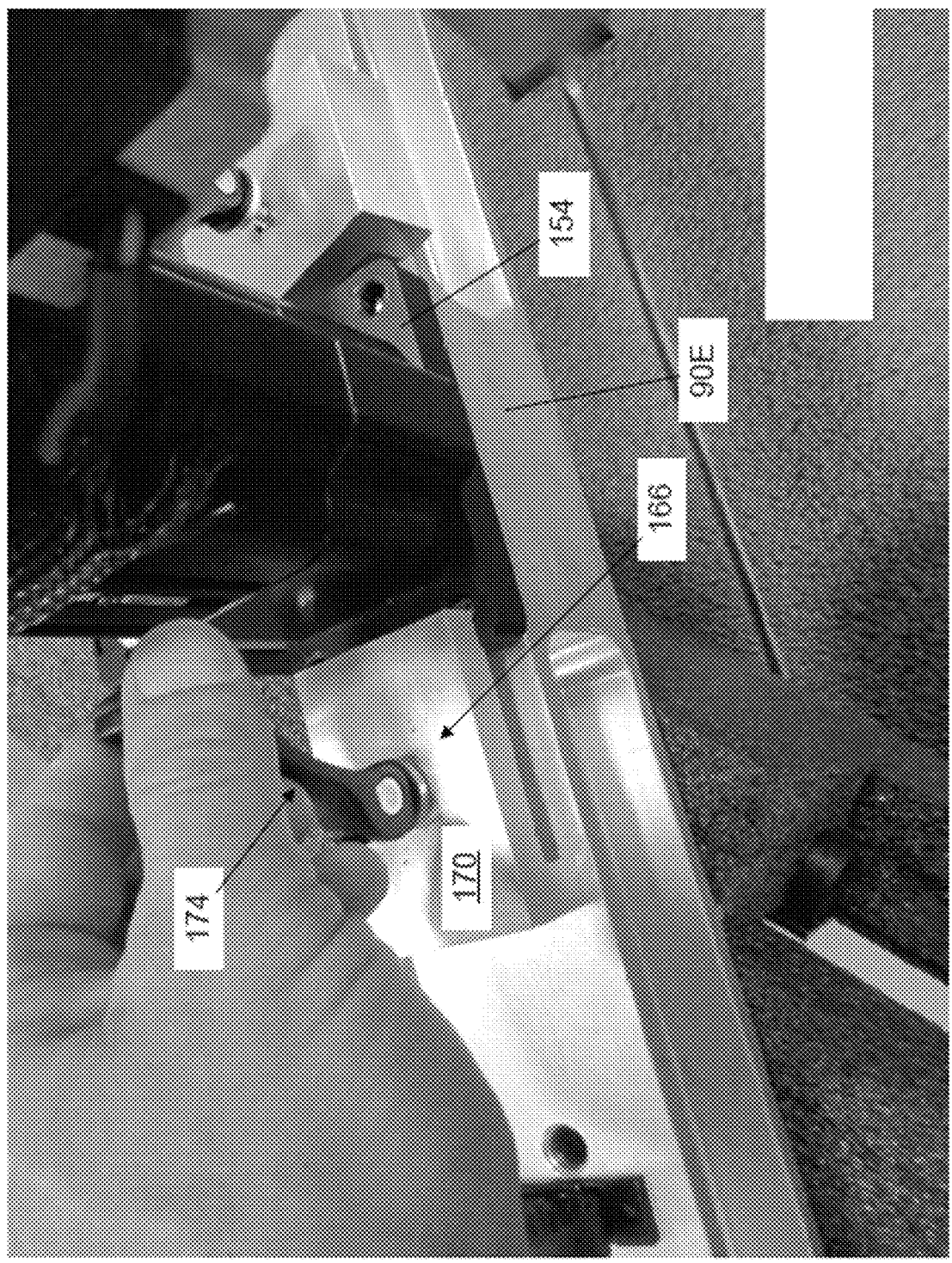

To connect the force applying assembly 18E to the frame assembly 34E, the base 154 is first positioned on the frame member 90E with the projections 158 engaging the recesses 162 (see FIGS. 30-31). The block 170 is pivoted to overlap the base 154 (see FIG. 32), and the handle 194 is pivoted relative to the stud 190 (see FIG. 33) to apply the clamping force to the block 170 and to the base 154 until the clamping position is reached (see FIGS. 25-29).

To disconnect the force applying assembly 18E, the process is reversed. The handle 194 is pivoted to reduce the clamping force (see FIGS. 32-33). With the clamping force reduced, the block 170 is pivoted to a release position (see FIGS. 30-31) in which the block 170 does not overlap the base 154 so that the base 154 (and the force applying assembly 18E) is removable from the frame assembly 34E.

Figure 34:
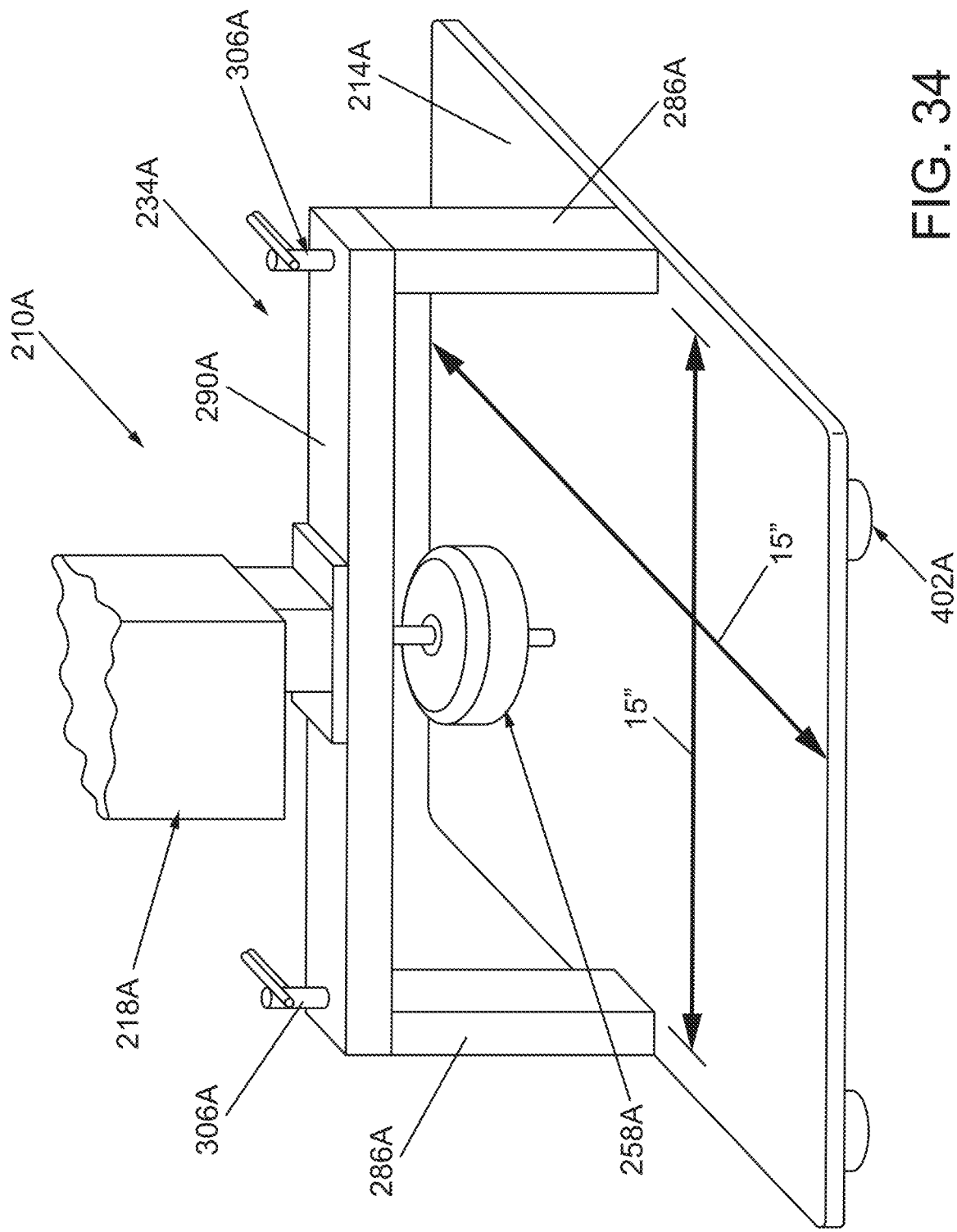
FIG. 34 is a perspective view of another alternative construction of a scale calibration device.
Figure 35:
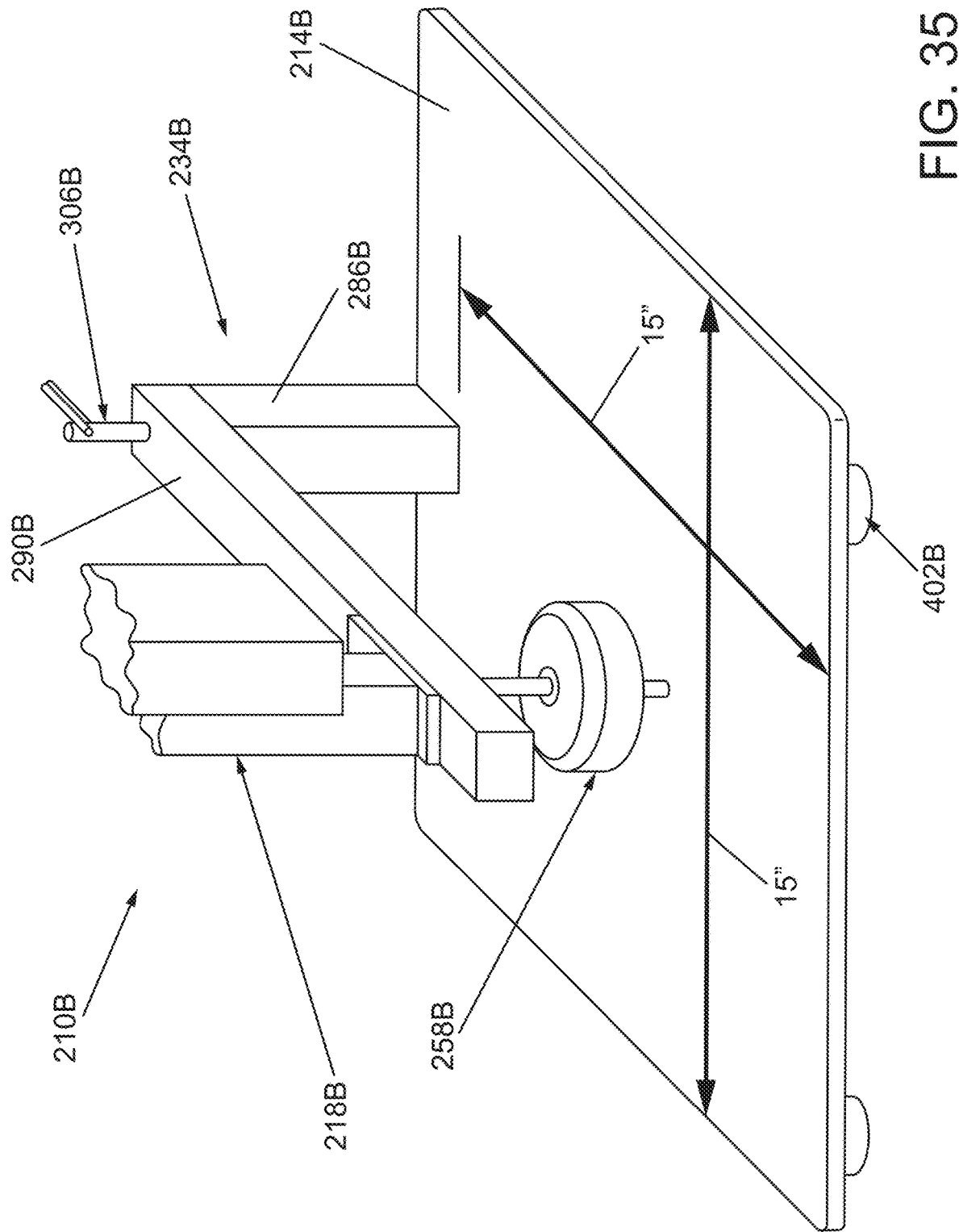
FIG. 35 is a perspective view of yet another alternative construction of a scale calibration device.
Figure 36:
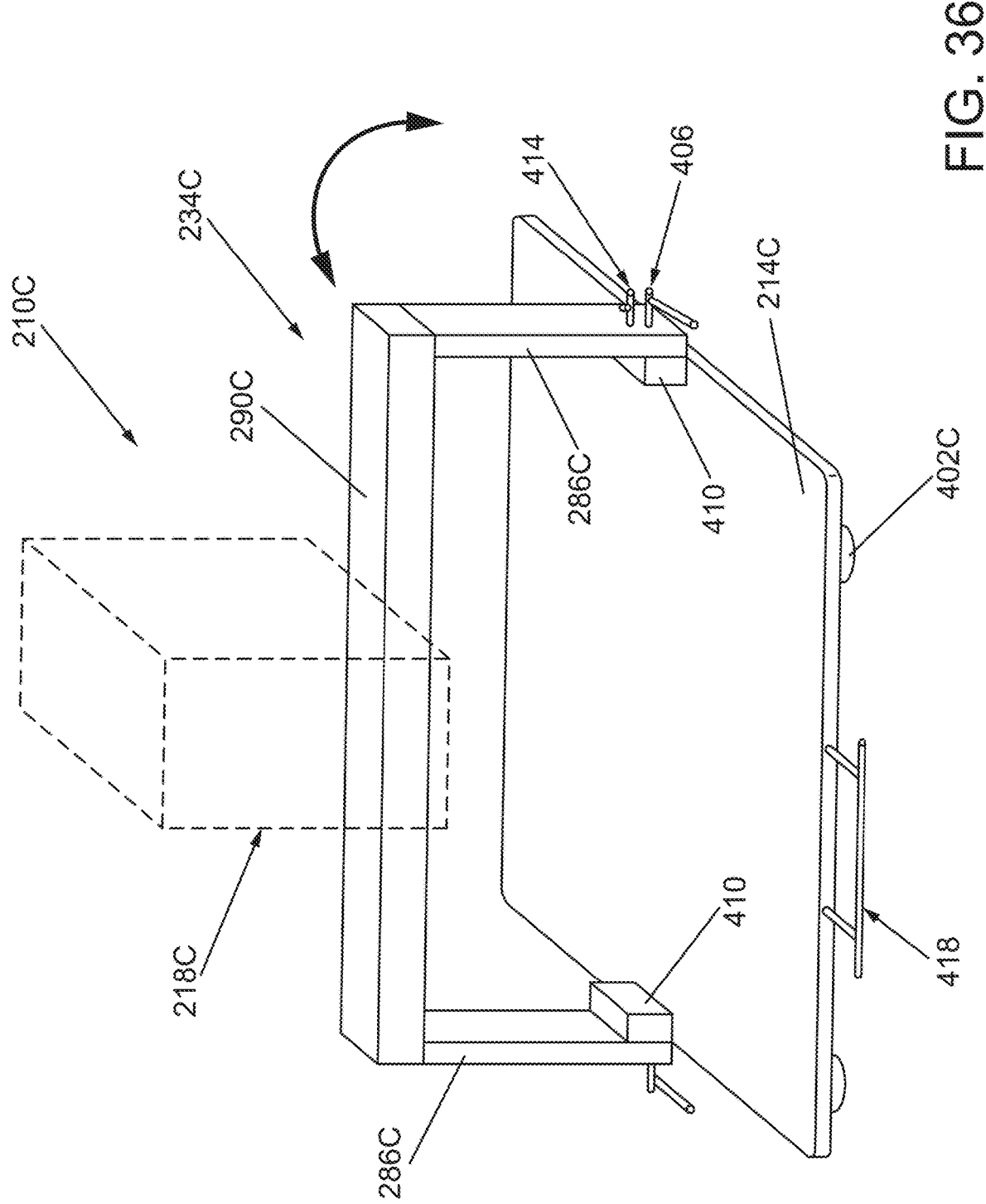
FIG. 36 is a perspective view of a further alternative construction of a scale calibration device.

In other constructions (not shown), a different connection mechanism 150 may be provided to removably connect the force applying assembly 18E to the frame assembly 34E. For example, such a connection mechanism 150 may include a threaded connection (e.g., a ¼ turn fastener), a bayonet connection, etc., between the force applying assembly 18E and the frame assembly 34E FIGS. 34-36 illustrate alternative constructions of scale calibration devices 210A, 210B and 210C, respectively. The devices 210A-210C are similar to the devices 10, 10A, 10B, 10C, 10D, 10E, described above and shown in FIGS. 1-33, and common elements have the same reference number plus 200.

Each device 210 may have a reduced size compared to the devices 10-10E. The device 210 may, for example, be supported on a work surface, such as a table top, by resilient feet 402 on its base 214. The device 210 is operable to calibrate a scale (not shown) which is able to be positioned on and calibrated by the device 210A-210C supported on the table top. The supported scale has a platform with a width of up to about 15 in., a length of up to about 15 in., and a thickness of up to about 5 in.

Each device 210 includes a base 214 which is smaller than the base 14-14E of the device 10-10E and a frame assembly 234 which has a likewise reduced size and spans at least a portion of the associated base 214. These components 214 and 234 have a weight which is less than the comparable components 14-14E and 34-34E (e.g., at least about 50% less). The illustrated base 214 has a width (within the upright(s) 286) of about 15 in. and a length of about 15 in.

Each device 210 also includes a force applying assembly 218 supported (e.g., removably) on the frame 234. The force applying assembly 218 may be the force applying assembly 18 used with different constructions of the device 10, 210. In other words, a single force applying assembly (e.g., assembly 18C) may be removed from its associated device (10C) and installed and used on another device (e.g., the device 210A) or vice versa. One force applying assembly 18, 218 may be included in a kit with multiple different bases and frame assemblies (e.g., a standard base 14C and frame assembly 34C and a reduced-size base 214A and frame assembly 234A).

As shown in FIG. 34, the frame assembly 234A is similar to the frame assembly 34C (see FIGS. 12-23) and is removably connected to the base 214A by a connection mechanism (e.g., bolts 306A extending through the crossmember 290A and uprights 286A and into the base 214A). The frame assembly 234B (see FIG. 35) is illustrated as a cantilever frame assembly, similar to the frame assemblies 34, 34A, and is removably connected to the base 214B by a connection mechanism (e.g., a bolt 306B extending through the crossmember 290B and the upright 286B into the base 214B).

As shown in FIG. 36, the frame assembly 234C is movably supported (e.g., pivotably) on the base 214C between an operating position (as shown) and a folded, non-operating position (not shown) for transportation, storage, etc. The force applying assembly 218C is removed before the frame assembly 234C is adjusted to the folded position and is installed after the frame assembly 234C is locked in the operating position.

A connection mechanism includes a pivot member 406 (e.g., a pivot bolt) pivotably connecting each upright 286C to the base 214C (e.g., a pivot block 410 supported on the base 214C). A locking assembly is operable to selectively retain the frame assembly 234C in position relative to the base 214C. The illustrated locking assembly includes at least one movable locking member (e.g., a locking pin or plunger 414; one for each upright 286C) engageable between the upright 286C and the base 214C (e.g., the pivot block 410). The plunger 414 engages a recess (not shown) in the pivot block 410 to retain the frame assembly 234C in the operating position (shown in FIG. 36). In the illustrated construction, the plunger 414 engages another recess (not shown) to also retain the frame assembly 234C in the folded position.

A handle 418 is supported on the device 210C to facilitate transport of the device 210C. The illustrated handle 418 is supported on the base 214C. The handle 418 may be fixed or movable (e.g., pivotable, slidable) between a carrying or storage/operation position.

The relatively smaller device 210 may be better suited for smaller platformed scales found in many primary care facilities. These primary care facilities have many scales across small exam rooms, as opposed to larger platform scales generally found in hospitals and used in the associated wider hallways and larger patient rooms. The smaller, lighter configuration of the device 210 may allow a calibration technician to move the device 210 around these multi-suite, narrow hallway primary care facility offices more easily without compromising the features of the device 210. This configuration may also enable the technician to more easily pack and transport the device 210 in a car or on an airplane.

In illustrated embodiments, the device 10-10E, 210A-210C may weigh significantly less than (e.g., about 10%) the force that can be applied to calibrate a scale S (for example, a force of up to about 1200 lbs. with a device weight of about 100-150 lbs.). As such, an operator need only be capable and is only required to transport the 100-150 lb. device 10-10E, 210A-210C (with individual components weighing much less (e.g., 35-75 lbs.) if configured to be removable) to the location L, place the scale S onto the base 22B, and operate the force applying assembly 18B to apply up to 1200 pounds of force. Use of the device 10-10E, 210A-210C may significantly reduce the physical requirements and effort to operate the device 10-10E, 210A-210C when compared to existing devices that require transportation of a test device along with actual, physical test weights.

Further, use of a force applying assembly 18-18E, 218A-218C, as opposed to finite test weights increases the operational range (i.e., the range of the force (simulated weight) that can be applied to the scale S) and deceases or eliminates any gap in test intervals for the device 10-10E, 210A-210C. For reference, the illustrated force applying assembly 18-18E, 218A-218C is operable to apply force in a range between about 0.5 lbs. and about 1200 lbs. at about 0.5 lb. intervals. In comparison, existing test devices using finite test weights have a more limited range (up to about 300 lbs. to 500 lbs. of test weights which much be transported along with the test device to the location L), and rely on test weights with values of 5 lbs. to 10 lbs. leaving relatively large gaps between test intervals.

The independent embodiments described above and illustrated in the figures are presented by way of example only and are not intended as a limitation upon the concepts and principles of the present invention. As such, it will be that various changes in the elements and their configuration and arrangement are possible without departing from the spirit and scope of the present invention. For example, various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

One or more independent features and/or independent advantages may be set forth in the following claims:

What is claimed is:

1. A device comprising:
   a base including a base surface, the base configured to move the device along a surface and to support a scale to be calibrated;
   a handle detachably connected to the base and configured to be grasped by a user to move the device;
   a frame assembly connected to the base, the frame assembly including a first upright beam and a second upright beam spaced apart by a gap from the first upright beam, the first and second upright beams being connected to and extending away from the base, the frame assembly further including a crossbeam connected to and extending between the first and second upright beams to interconnect the first and second upright beams, the crossbeam spaced apart from the base surface;
   a frame connection mechanism configured to releasably connect the frame assembly to the base;
   a force applying assembly supported by the frame assembly and extending transverse from the crossbeam, the force applying assembly being configured to apply a force simulating a dead weight to the scale supported on the base surface; and
   a support assembly connected to one selected from the group consisting of the base, the handle, and the frame assembly, the support assembly configured to support a computing device for use in calibration of the scale.

2. The device of claim 1, wherein the force applying assembly includes a force applying member and an actuator configured to actuate the force applying member.

3. The device of claim 2, wherein the actuator includes a motor and a gear mechanism configured to actuate the force applying member to apply the force to the scale to be calibrated.

4. The device of claim 3, wherein the force is applied along an axis, and wherein the motor is positioned on one side of the axis and the gear mechanism is positioned on an opposite side of the axis.

5. The device of claim 2, wherein the actuator includes a motor and a gear mechanism configured to actuate the force applying member to apply the force to the scale to be calibrated, the motor and the gear mechanism being positioned substantially over the crossbeam.

6. The device of claim 1, wherein the force applying assembly is connected to the crossbeam proximate a midpoint between the first and second upright beams.

7. The device of claim 1, wherein the force applying assembly includes one of a load cell, a piston-cylinder assembly, a hydraulic cylinder, a pneumatic cylinder, a screw jack, a screw lift, a motor-driven gear mechanism, and an electromagnet.

8. The device of claim 1, wherein the force applying assembly is removable from the frame assembly.

9. The device of claim 8, further comprising a toolless connection mechanism configured to releasably connect the force applying assembly to the frame assembly, the toolless connection mechanism including a clamp assembly engageable between the force applying assembly and the frame assembly.

10. The device of claim 1, wherein the crossbeam extends along a beam axis, wherein the handle is positioned along the beam axis and spaced from the first and second upright beams.

11. The device of claim 1, the frame connection mechanism includes a bolt extending through a portion of the frame assembly and into a receptacle defined in the base, and a handle engaging the bolt and configured to rotate the bolt relative to the base to selectively connect and disconnect, respectively, the frame assembly and the base.

12. The device of claim 11, wherein the base is formed of a first material, and wherein the connection mechanism includes an insert formed of a second material different than the first material, the insert being supported by the base in the receptacle and configured to releasably receive an end of the bolt.

13. The device of claim 1, wherein the support assembly includes an arm pivotable about a generally horizontal axis and about a generally vertical axis.

14. A method of calibrating a scale, the method comprising:
  providing a scale calibration device including a base with a base surface, the base configured move the calibration device along a surface and to support a scale to be calibrated, a handle detachably connected to the base and configured to be grasped by a user to move the scale calibration device, a frame assembly connectable to the base and including a first upright beam and a second upright beam connected to and extending away from the base, and a crossbeam connected to and extending between the first and second upright beams to interconnect the first and second upright beams, a frame connection mechanism, a force applying assembly supported by the frame assembly and extending transverse from the crossbeam, and a support assembly connected to one selected from the group consisting of the base, the handle, and the frame assembly, the support assembly configured to support a computing device for use in calibration of the scale;
  moving the calibration device to a location;
  proximate the location, utilizing the frame connection mechanism to releasably connect the frame assembly to the base;
  proximate the location, supporting a scale to be calibrated on the base surface; and
  with the force applying assembly, applying a force simulating a dead weight to the scale supported on the base surface to calibrate the scale.

15. The method of claim 14, wherein the scale calibration device further includes a toolless connection mechanism, and wherein the method further comprises, before applying a force simulating a dead weight, proximate the location, utilizing the toolless connection mechanism to releasably connecting the force applying assembly to the frame assembly.

* * * * *